US012502778B2

(12) United States Patent
Czinger

(10) Patent No.: US 12,502,778 B2
(45) Date of Patent: Dec. 23, 2025

(54) MEASUREMENT-BASED CORRECTIONS FOR STRUCTURE ASSEMBLY

(71) Applicant: Divergent Technologies, Inc., Los Angeles, CA (US)

(72) Inventor: Lukas Philip Czinger, Santa Monica, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 350 days.

(21) Appl. No.: 18/159,470

(22) Filed: Jan. 25, 2023

(65) Prior Publication Data

US 2023/0234228 A1    Jul. 27, 2023

Related U.S. Application Data

(60) Provisional application No. 63/302,979, filed on Jan. 25, 2022.

(51) Int. Cl.
*B25J 9/16* (2006.01)
*B22F 12/88* (2021.01)
*B33Y 40/00* (2020.01)

(52) U.S. Cl.
CPC ............ *B25J 9/1664* (2013.01); *B22F 12/88* (2021.01); *B25J 9/1653* (2013.01); *B25J 9/1669* (2013.01);
(Continued)

(58) Field of Classification Search
None
See application file for complete search history.

(56) References Cited

U.S. PATENT DOCUMENTS

| 5,148,591 | A | 9/1992 | Pryor |
| 5,203,226 | A | 4/1993 | Hongou et al. |

(Continued)

FOREIGN PATENT DOCUMENTS

| CA | 2936643 A1 | 5/2017 |
| CN | 103889650 A | 6/2014 |

(Continued)

OTHER PUBLICATIONS

US 9,202,136 B2, 12/2015, Schmidt et al. (withdrawn)
(Continued)

*Primary Examiner* — Jason Holloway
*Assistant Examiner* — Bryant Tang
(74) *Attorney, Agent, or Firm* — ArentFox Schiff LLP

(57) ABSTRACT

Systems, methods, and computer-readable media for robotic joining of components, parts, and structures are disclosed. A method in accordance with an aspect of the present disclosure comprises determining a target first position and a target second position in a reference frame, controlling robotic arms to move a first part to the target first position and a second part to the target second position, measuring the parts at the target first and second positions to obtain a measured first and second positions, performing a first operation to determine differences between the measured positions and the target positions, and when the differences exceeds desired tolerances, controlling the robotic arms to move the parts to compensate for the differences, and controlling at least the first or second robotic arm to join the first and second parts after the first and second operations are concluded.

94 Claims, 16 Drawing Sheets

(52) U.S. Cl.
CPC .......... *B25J 9/1682* (2013.01); *B25J 9/1697* (2013.01); *B33Y 40/00* (2014.12)

(56) References Cited

U.S. PATENT DOCUMENTS

| | | | |
|---|---|---|---|
| 5,380,978 A | 1/1995 | Pryor | |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,509,576 B2 | 1/2003 | Woo-Dong | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,929,267 B2 | 4/2011 | Hoch et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |
| 9,821,339 B2 | 11/2017 | Paschkewitz et al. | |

(56) References Cited

U.S. PATENT DOCUMENTS

| | | |
|---|---|---|
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |

(56) References Cited

U.S. PATENT DOCUMENTS

| | | |
|---|---|---|
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 11,034,024 B2 | 6/2021 | Saez et al. |
| 11,449,021 B2 | 9/2022 | Czinger et al. |
| 11,534,975 B2 | 12/2022 | Ribble et al. |
| 11,559,897 B2 | 1/2023 | Ghanem |
| 11,603,150 B2 | 3/2023 | Chami et al. |
| 2002/0182339 A1 | 12/2002 | Taylor et al. |
| 2004/0115033 A1 | 6/2004 | Rommes |
| 2004/0143951 A1 | 7/2004 | Berninger |
| 2005/0092052 A1 | 5/2005 | Stone et al. |
| 2005/0095096 A1 | 5/2005 | Curotto et al. |
| 2006/0108783 A1 | 5/2006 | Ni et al. |
| 2007/0017081 A1 | 1/2007 | Becker et al. |
| 2009/0038361 A1 | 2/2009 | Toeniskoetter |
| 2009/0240372 A1 | 9/2009 | Bordyn et al. |
| 2010/0274390 A1 | 10/2010 | Walser et al. |
| 2011/0022216 A1 | 1/2011 | Andersson |
| 2011/0185556 A1 | 8/2011 | Hirano et al. |
| 2013/0010081 A1 | 1/2013 | Tenney et al. |
| 2014/0212637 A1 | 7/2014 | Syvret et al. |
| 2014/0271061 A1 | 9/2014 | Fukuda et al. |
| 2014/0277669 A1 | 9/2014 | Nardi et al. |
| 2015/0336271 A1 | 11/2015 | Spicer et al. |
| 2016/0023355 A1 | 1/2016 | Komatsu et al. |
| 2017/0043477 A1 | 2/2017 | Kitayama et al. |
| 2017/0050277 A1 | 2/2017 | Shi et al. |
| 2017/0052534 A1 | 2/2017 | Ghanem |
| 2017/0057082 A1 | 3/2017 | Grigorenko et al. |
| 2017/0095930 A1 | 4/2017 | Warashina et al. |
| 2017/0113344 A1 | 4/2017 | Schönberg |
| 2017/0120514 A1 | 5/2017 | Miller |
| 2017/0192415 A1 | 7/2017 | Grant et al. |
| 2017/0341309 A1 | 11/2017 | Piepenbrock et al. |
| 2018/0043540 A1 | 2/2018 | Satou |
| 2018/0099365 A1 | 4/2018 | Osato et al. |
| 2018/0299267 A1 | 10/2018 | Durand et al. |
| 2018/0345483 A1 | 12/2018 | Sirkett et al. |
| 2019/0217545 A1 | 7/2019 | Eller et al. |
| 2019/0232317 A1 | 8/2019 | Seubert et al. |
| 2019/0315057 A1 | 10/2019 | Budge et al. |
| 2019/0358816 A1 | 11/2019 | Saito et al. |
| 2020/0192311 A1 | 6/2020 | Czinger et al. |
| 2020/0262078 A1* | 8/2020 | Saez ..................... B25J 9/1697 |
| 2021/0154950 A1 | 5/2021 | Czinger |
| 2022/0089237 A1 | 3/2022 | Sverdlov et al. |
| 2022/0314468 A1* | 10/2022 | Hwang ................. B25J 13/088 |

FOREIGN PATENT DOCUMENTS

| | | | |
|---|---|---|---|
| CN | 105081761 A | | 11/2015 |
| CN | 205201527 U | | 5/2016 |
| CN | 106466847 A | | 3/2017 |
| CN | 107922016 A | | 4/2018 |
| CN | 110282049 A | | 9/2019 |
| EP | 2965834 A2 | | 1/2016 |
| JP | 11-184526 A | | 7/1999 |
| JP | 2009-148869 A | | 7/2009 |
| JP | 2010-142901 A | | 7/2010 |
| JP | 2011-507714 A | | 3/2011 |
| JP | 2019-141942 A | | 3/2011 |
| JP | 2017-019053 A | | 1/2017 |
| JP | 2023000089 A | * | 1/2023 |
| KR | 10-2022-0052411 A | | 4/2022 |
| KR | 102709375 B1 | * | 9/2024 ............. B25J 13/08 |
| WO | 1996036455 A1 | | 11/1996 |
| WO | 1996036525 A1 | | 11/1996 |
| WO | 1996038260 A1 | | 12/1996 |
| WO | 2003024641 A1 | | 3/2003 |
| WO | 2004108343 A1 | | 12/2004 |
| WO | 2005093773 A1 | | 10/2005 |
| WO | 2007003375 A1 | | 1/2007 |
| WO | 2007110235 A1 | | 10/2007 |
| WO | 2007110236 A1 | | 10/2007 |
| WO | 2008019847 A1 | | 2/2008 |
| WO | 2007128586 A3 | | 6/2008 |
| WO | 2008068314 A2 | | 6/2008 |
| WO | 2008086994 A1 | | 7/2008 |
| WO | 2008087024 A1 | | 7/2008 |
| WO | 2008107130 A1 | | 9/2008 |
| WO | 2008138503 A1 | | 11/2008 |
| WO | 2008145396 A1 | | 12/2008 |
| WO | 2009083609 A2 | | 7/2009 |
| WO | 2009098285 A1 | | 8/2009 |
| WO | 2009112520 A1 | | 9/2009 |
| WO | 2009135938 A1 | | 11/2009 |
| WO | 2009140977 A1 | | 11/2009 |
| WO | 2010125057 A2 | | 11/2010 |
| WO | 2010125058 A1 | | 11/2010 |
| WO | 2010142703 A2 | | 12/2010 |
| WO | 2011032533 A1 | | 3/2011 |
| WO | 2014016437 A1 | | 1/2014 |
| WO | 2014187720 A1 | | 11/2014 |
| WO | 2014195340 A1 | | 12/2014 |
| WO | 2015193331 A1 | | 12/2015 |
| WO | 2016116414 A1 | | 7/2016 |
| WO | 2017036461 A1 | | 3/2017 |
| WO | 2019030248 A1 | | 2/2019 |
| WO | 2019042504 A1 | | 3/2019 |
| WO | 2019048010 A1 | | 3/2019 |
| WO | 2019048498 A1 | | 3/2019 |
| WO | 2019048680 A1 | | 3/2019 |
| WO | 2019048682 A1 | | 3/2019 |
| WO | WO-2023246907 A1 * | | 12/2023 |

OTHER PUBLICATIONS

US 9,809,265 B2, 11/2017, Kinjo (withdrawn)
US 10,449,880 B2, 10/2019, Mizobata et al. (withdrawn)
English translation of KR-102709375-B1 (wherein the paragraph numbering provided coincides with any relevant citations to this

(56) References Cited

OTHER PUBLICATIONS reference within the accompanying Office Action) (Year: 2024).*
English translation of WO-2023246907-A1 (wherein the paragraph numbering provided coincides with any relevant citations to this reference within the accompanying Office Action) (Year: 2023).*
English translation of JP-2023000089-A (wherein the paragraph numbering provided coincides with any relevant citations to this reference within the accompanying Office Action) (Year: 2023).*
International Search Report and Written Opinion in PCT/US2023/061314, mailed Aug. 10, 2023, 12 pages.
Invitation to Pay Additional Fees in PCT/US2023/061314, mailed May 12, 2023, 2 pages.
Bone et al., "Vision-Guided fixtureless Assembly of Automotive Components", Robotics and Computer Integrated Manufacturing, vol. 19, 2003, pp. 79-87.
Cai at al., "Automated Robotic Assembly of 3D Mesostructure via Guided Mechanical Buckling", 2021 IEEE 17th International Conference on Automation Science and Engineering (CASE), Aug. 2021, pp. 2098-2104.
Corona-Gastuera et al., "An Approach for Intelligent Fixtureless Assembly: Issues and Experiments" Lecture Notes in Computer Science, vol. 3789, Nov. 2005, pp. 1052-1061.
Extended European Search Report received for European Patent Application No. 20209019.7, mailed on Apr. 20, 2021, 11 pages.
Extended European Search Report received for European Patent Application No. 19899588.8, mailed on Nov. 17, 2022, 18 pages.
International Search Report and Written Opinion received for PCT Patent Application No. PCT/US2019/066759, mailed on Mar. 5, 2020, 11 pages.
International Search Report and Written Opinion received for PCT Patent Application No. PCT/US2020/061365, mailed on Feb. 17, 2021, 12 pages.
Mills et al., "Robotic Fixtureless Assembly of Sheet Metal Parts Using Dynamic Finite Element Models: Modelling and Simulation", Proceedings of 1995 IEEE International Conference on Robotics and Automation, 1995, pp. 2430-2537.
Office Action received for Chinese Patent Application No. 201911304266.4, mailed on Dec. 27, 2022, 28 pages (15 pages of English Translation and 13 pages of Original Document).
Office Action received for Chinese Patent Application No. 202080080839.4, mailed on Sep. 14, 2023, 24 pages (12 pages of English Translation and 12 pages of Original Document).
Office Action received for Japanese Patent Application No. 2021-534991, mailed on Dec. 5, 2023, 21 pages (10 pages of English Translation and 11 pages of Original Document).
Office Action received for Japanese Patent Application No. 2022-526689, mailed on Jul. 16, 2024, 12 Pages (6 pages of English Translation and 6 pages of Original Document).
Ogun et al., "3D vision assisted flexible robotic assembly of machine components", Proceedings of SPIE—The International Society for Optical Engineering, vol. 9875, Dec. 2015, pp. 98751O-1-98751O-7.
Pires et al., "The role of robotics in additive manufacturing: review of the AM processes and introduction of an intelligent system", Industrial Robot: the international journal of robotics research and application, ISSN 0143-991X, Dec. 28, 2021, 21 pages.
Office Action received for Japanese Patent Application No. 2021-534991, mailed on Jun. 3, 2025, 15 pages (7 pages of English Translation and 8 pages of Original Document).

* cited by examiner

MEASUREMENT-BASED CORRECTIONS FOR STRUCTURE ASSEMBLY

CROSS-REFERENCE TO RELATED APPLICATIONS

The present disclosure claims the benefit under 35 U.S.C. § 119 to U.S. Patent Application No. 63/302,979, filed Jan. 25, 2022 entitled "MEASUREMENT-BASED CORRECTIONS FOR ADDITIVELY MANUFACTURED STRUCTURE ASSEMBLY" which application is incorporated by reference herein in its entirety.

BACKGROUND

Field

The present disclosure relates generally to apparatus and techniques in manufacturing, and more specifically to measurement-based corrections for structure assembly.

Background

Three-dimensional (3-D) printing, which may also be referred to as additive manufacturing (AM), is a process used to create 3-D objects. The 3-D objects may be formed using layers of material based on a digital model data of the object. A 3-D printer may form the structure defined by the digital model data by printing the structure one layer at a time.

A 3-D printer may disseminate a powder layer (e.g., powdered metal) on an operating surface. The 3-D printer may then consolidate particular areas of the powder layer into a layer of the object, e.g., by using a laser to melt or sinter the powder of the powder layer together. The steps may be repeated to sequentially form each layer. Accordingly, the 3-D printed object may be built layer by layer to form the 3-D object.

3-D printing is non-design specific, which offers geometric and design flexibility that conventional manufacturing processes cannot. Furthermore, 3-D printing technologies can produce parts with very small feature sizes, and geometries that are either significantly difficult or impossible to produce using conventional manufacturing processes.

Very large components which exceed printer size specifications can be segregated at the design phase, printed in parallel and combined. Further, 3-D printed components may be used to produce sub-components for various devices or apparatus. The 3-D printed sub-components may need to be attached or connected to other sub-components, including other 3-D printed sub-components, extruded sub-components, COTS parts, or still other sub-components. In other cases, nodes as described herein may need to be attached to other nodes or to joints, extrusions, and other parts. For these and other example cases, adhesives may be used to combine two or more 3-D printed parts.

SUMMARY

Several aspects of apparatus for systems and methods for automatically joining parts will be described more fully hereinafter.

A method in accordance with an aspect of the present disclosure comprises defining a reference frame, moving a first part to a first position in the reference frame with a first robot, moving a second part to a second position in the reference frame with a second robot, wherein the second position is determined with respect to the first position, accessing a measurement instrument coupled to at least one of the first robot and the second robot to measure at least one of the first position and the second position with respect to a desired tolerance, and changing at least one of the first position and the second position to an adjusted position using the measurement instrument if the desired tolerance is exceeded.

A system for automatically joining parts in accordance with an aspect of the present disclosure comprises a first robot for manipulating a first part, a second robot for manipulating a second part, a measurement instrument coupled to at least the first robot, and at least one controller, coupled to the first robot, the second robot, and the measurement instrument, wherein the at least one controller transmits signals to the first robot and the second robot to move the first part to a first position, move the second part to a second position, wherein the second position is determined with respect to the first position, provide access to the measurement instrument coupled to at least the first robot to measure the first position with respect to a desired tolerance, and change the first position to an adjusted position if the desired tolerance is exceeded.

A non-transitory computer-readable medium in accordance with an aspect of the present disclosure comprises storing computer executable code for assembling parts, the code when executed by a processor causes the processor to define a reference frame, move a first part to a first position in the reference frame with a first robot, move a second part to a second position in the reference frame with a second robot, wherein the second position is determined with respect to the first position, access a measurement instrument coupled to at least one of the first robot and the second robot to measure at least one of the first position and the second position with respect to a desired tolerance, and change at least one of the first position and the second position to an adjusted position using the measurement instrument if the desired tolerance is exceeded.

It will be understood that other aspects of apparatus for automatically joining parts will become readily apparent to those skilled in the art from the following detailed description, wherein it is shown and described only several embodiments by way of illustration. As will be realized by those skilled in the art, other and different embodiments are capable of being utilized, and its several details are capable of modification in various other respects, all without departing from the disclosure. Accordingly, the drawings and detailed description are to be regarded as illustrative in nature and not as restrictive.

BRIEF DESCRIPTION OF THE DRAWINGS

Various aspects of apparatuses and methods for joining parts will now be presented in the detailed description by way of example, and not by way of limitation, in the accompanying drawings, wherein.

DETAILED DESCRIPTION

Figure 1A:
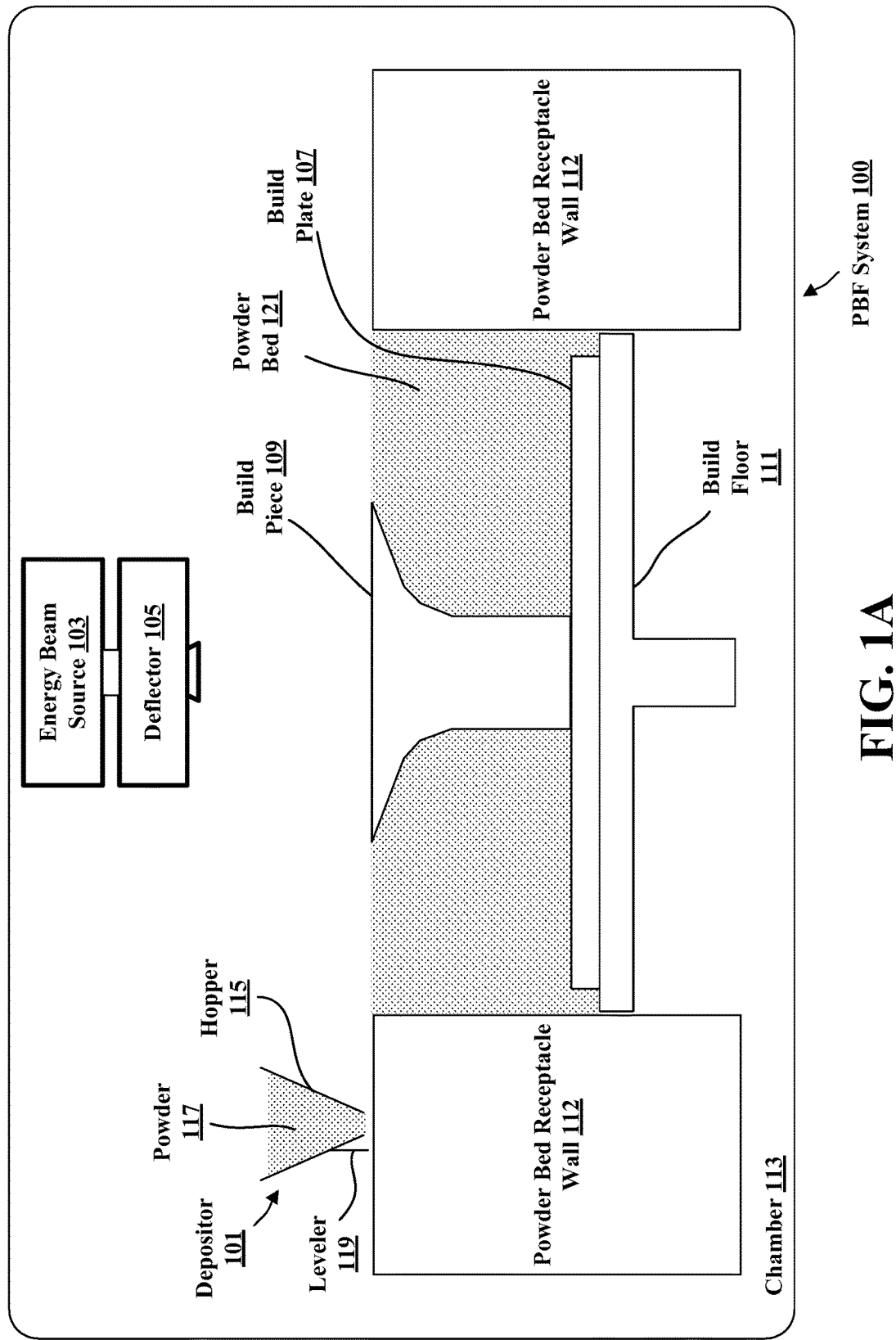
FIGS. 1A-1D illustrate respective side views of a 3-D printer system in accordance with an aspect of the present disclosure.

The detailed description set forth below in connection with the drawings is intended to provide a description of example embodiments of the present invention. The description is not intended to represent the only embodiments in which the invention may be practiced. The term "example" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form or may be shown not drawn to scale, or omitted entirely, in order to avoid obscuring the various concepts presented throughout this disclosure.

Overview

The use of additive manufacturing in the context of joining two or more parts provides significant flexibility and cost saving benefits that enable manufacturers of mechanical structures and mechanized assemblies to manufacture parts with complex geometries at a lower cost to the consumer. The joining techniques described in the foregoing relate to a process for connecting AM parts, non-AM parts, and/or commercial off the shelf (COTS) components. AM parts are printed three-dimensional (3-D) parts that are printed by adding layer upon layer of a material based on a preprogramed design. The parts described in the foregoing may be parts used to assemble a transport structure such as an automobile. However, those skilled in the art will appreciate that the manufactured parts may be used to assemble other complex mechanical products such as vehicles, trucks, trains, motorcycles, boats, aircraft, and the like, and other mechanized assemblies, without departing from the scope of the disclosure.

AM may be used to manufacture nodes. A node is a structural member that may include one or more interfaces used to connect to other nodes or other structures, e.g., spanning components such as tubes, extrusions, panels, and the like. Using AM, a node may be constructed to include additional features and functions, including interface functions, depending on the objectives.

As described above, nodes and other components may be connected together. For example, one or more nodes and/or other components may be connected together to form larger components. Accordingly, individual AM structures often need to be connected together, or individual AM structures often need to be connected to machined or COTS parts, to provide combined structures, e.g., to realize the above modular network or to form a complex interior assembly in a vehicle. Examples include node-to-node connections, node-to-panel connections, node-to-tube connections, and node-extrusion connections, among others. To connect an AM joint member with a vehicle body panel, for example, mechanical connectors (e.g., screws, clamps, etc.) may be used. Alternatively or additionally, an adhesive may be used to form a strong bond. For connecting these parts, a strict tolerance is often required, meaning that the parts must be positioned to fit precisely in an established orientation. For example, the two parts to be adhered may need to be positioned to avoid direct contact with each other in order to mitigate possible galvanic corrosion problems. In general, an adhesive connection between the AM joint member and panel should result in an accurate fit. Thus the AM joint member should not be misaligned with or offset from the body panel, for example, and the parts should remain properly oriented when a permanent bond is established.

The present disclosure is directed to methods, apparatuses, articles of manufacture, and computer-readable media for joining parts.

Related attempts at addressing the problems described herein include manual adjustment of the parts after initial robotic assembly, which requires additional time, effort, and expense during the manufacturing process. An advantage of the present disclosure is that reductions in manufacturing time and cost are possible within the scope of the present disclosure.

One of the parts involved in the adhesion process may be a node. In addition to their ability to interconnect different types of structures, nodes can be fabricated to perform a variety of different functions. For example, and not by way of limitation, nodes can be used to route electrical circuitry in vehicles or to enable fluid flow.

Nodes can be formed by fusing a powder material. For example, a 3-D printer can melt and/or sinter at least a portion of the powder material in multiple layers to form the node. Nodes may be formed of a single material, or a combination of materials, as desired. The node may be formed of flexible materials, a substantially rigid material, or a combination of flexible and rigid materials as desired. The materials in a node may include a metallic material (e.g. aluminum, titanium, stainless steel, brass, copper, Chromoly steel, iron, etc.), a composite material (e.g. carbon fiber, etc.), a polymeric material (e.g. plastic, etc.), and/or a combination of these materials and/or other materials, without departing from the scope of the present disclosure.

Nodes can be particularly useful in joint designs for connecting various parts of complex structures, for example. In some designs, nodes can allow for higher levels of dimensional tolerance acceptance that may be needed when assembling complex structures. Node-based designs can also allow for reduced weight, reduced post-processing, and increased ease of assembly. In addition, nodes can be used as sockets to adjust for tolerance in designs, and nodes can be co-printed with other parts, which takes advantage of a unique benefit of 3-D printing to simplify the assembly process.

Nodes can be connected to other nodes, panels, tubes, extrusions, and other parts. The connection may involve a mechanical connection, an adhesive connection, or some combination of the two. In embodiments where a size of the node exceeds the printer size (e.g., the size of the powder bed), the node may be 3-D printed as a plurality of sub-nodes, which may then be combined through adhesion. Although the examples provided in the present disclosure use nodes as the structures to be joined together, one skilled in the art will understand the techniques and aspects described herein may be applied to structures manufactured in other ways, such as casting, forging, injection molding, extruding, etc.

Two parts may be adhered together in various ways. Adhesion may be performed manually, semi-automatically, or automatically. In the example case of an AM node used in a node-to-panel connection, adhesive, sealant, and/or vacuum ports may be 3-D printed into the AM node to enable an automated constructor to inject adhesive at a preconfigured port. The automated constructor, such as a robot, may use an effector specifically designed to inject adhesive into an injection port. In some cases, only adhesive is injected. In other cases, sealant may be injected to circumscribe the areas to where the adhesive can flow. A vacuum may also be applied in some cases to facilitate the flow of the adhesive into an adhesive region located at an interface between a surface of the AM node and a surface of the panel.

Whether the application of adhesive is performed manually or using automated means, the action of joining by bringing together structures with an adhesive in between may result in a positive pressure being applied to the corresponding structures being joined due to the viscosity of the adhesive, which may result in the misalignment of the two structures being joined.

Further, with or without the problem of positive pressure upon the application of the adhesive, many or most adhesives expand or contract when curing, especially when being thermally cured. This expansion or contraction may similarly result in an improper alignment or other faulty connection of the parts being adhered.

In an aspect of the disclosure, one or more part retention features may be used to couple parts together. The part retention features may be mechanical structures operable for use in securing the two or more parts being connected, such as through adhesion or other coupling methods. The part retention features may cause the parts being connected to temporarily remain in position during either or both of application or curing of the primary adhesive used to bond the parts. The part retention features may be temporary in nature and may be removed after the adhesion process is complete. Alternatively, the part retention features may be permanent. In the latter case, the features may add no appreciable mass or other adverse effect to the adhered structure, and therefore it may not be necessary to add a removal step to the manufacturing process. The features in some cases may have alternative uses beyond those of part retention.

The use of 3-D printing may provide significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that may not be possible to manufacture via traditional manufacturing processes or may be cost prohibitive to manufacture via traditional manufacturing processes. As discussed above, the 3-D printed sub-components may need to be attached or connected to other sub-components, including other 3-D printed sub-components, extruded sub-components, or still other sub-components.

Additive Manufacturing Environment

FIGS. 1A-D illustrate respective side views of an example 3-D printer system in an aspect of the present disclosure.

A 3-D printer system may be a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 can also include a build floor 111 positioned within a powder bed receptacle. The walls 112 of the powder bed receptacle generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
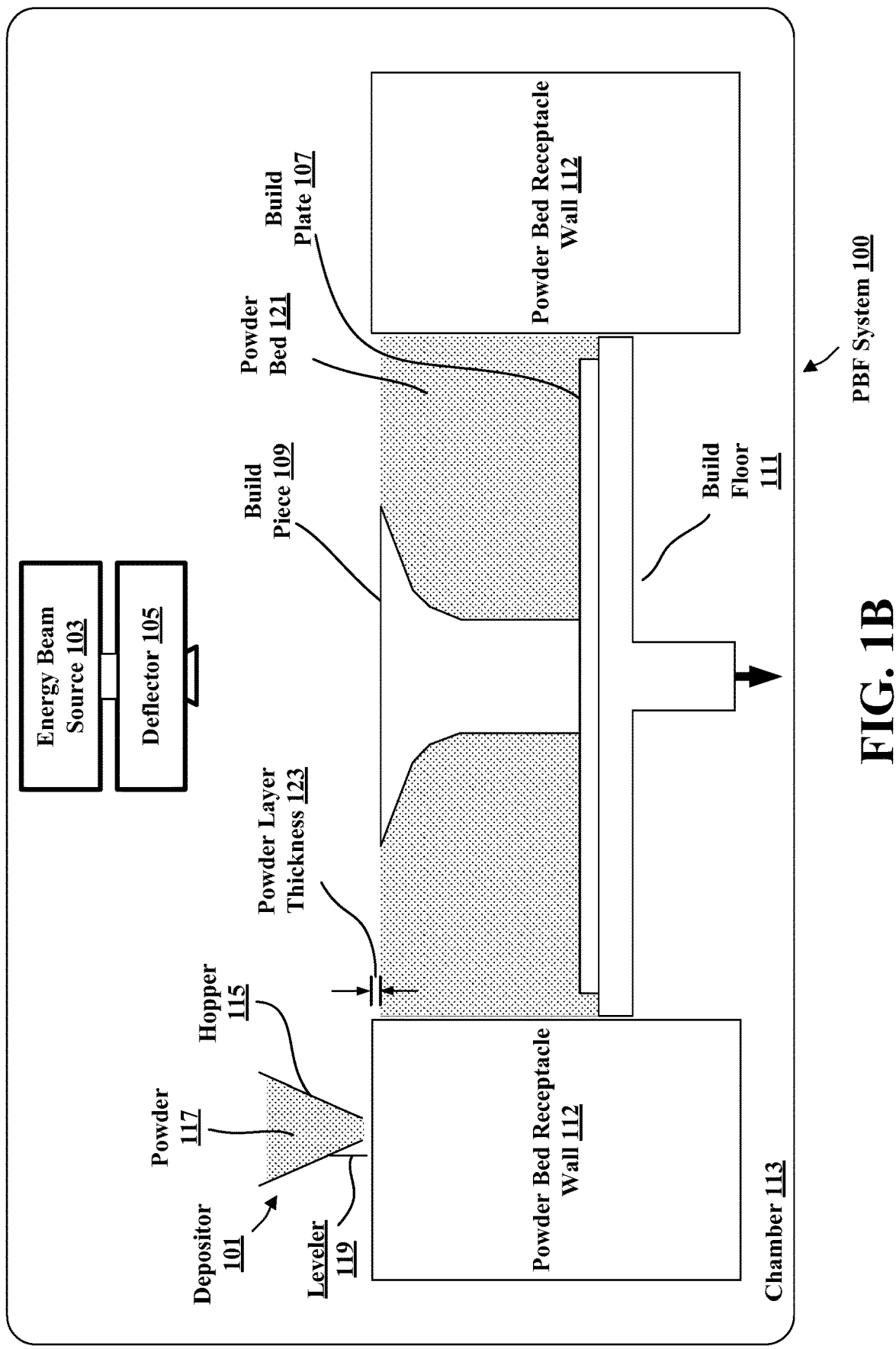

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
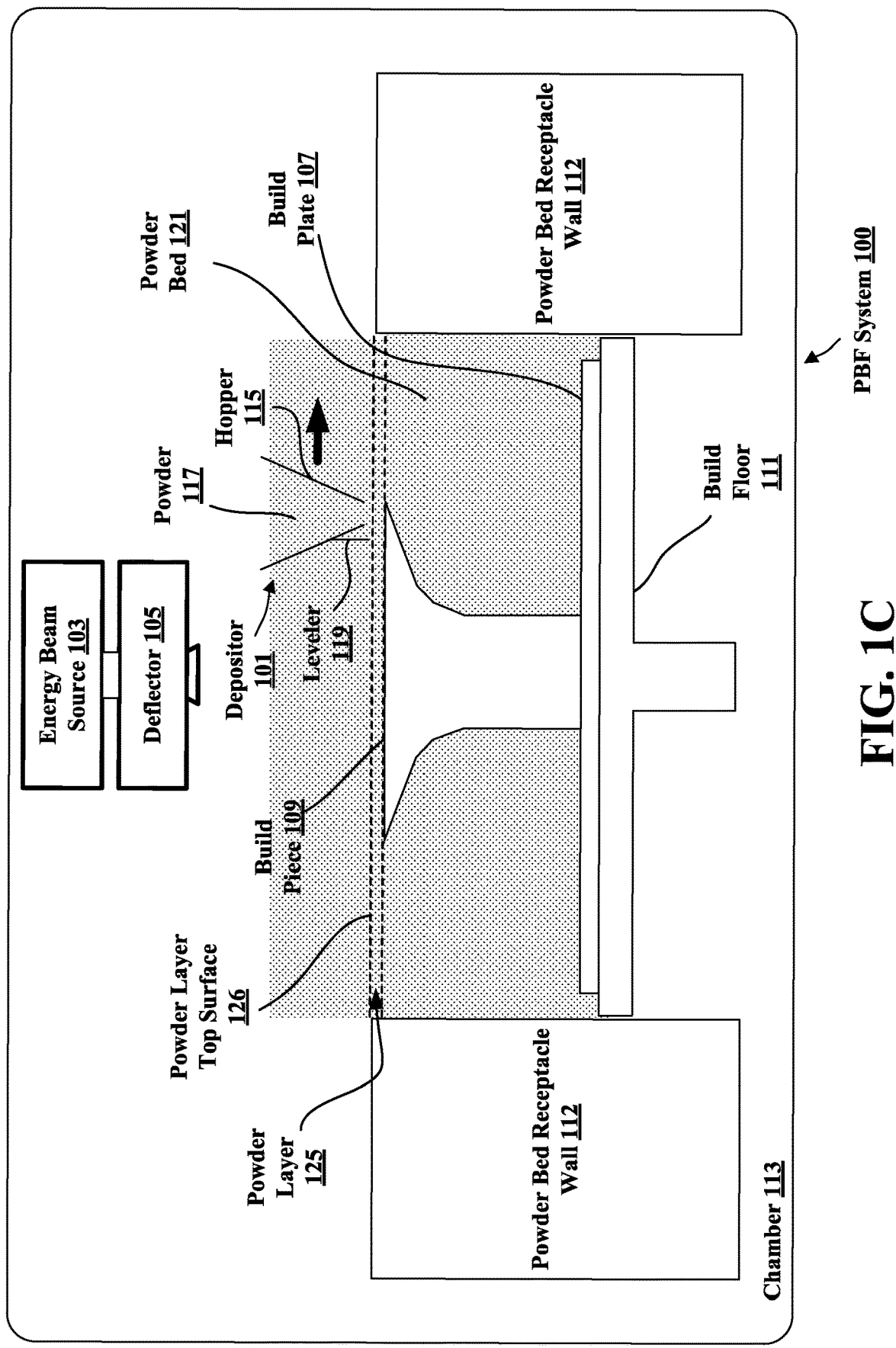

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has powder layer top surface 126 and a thickness substantially equal to the powder layer thickness 123. Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
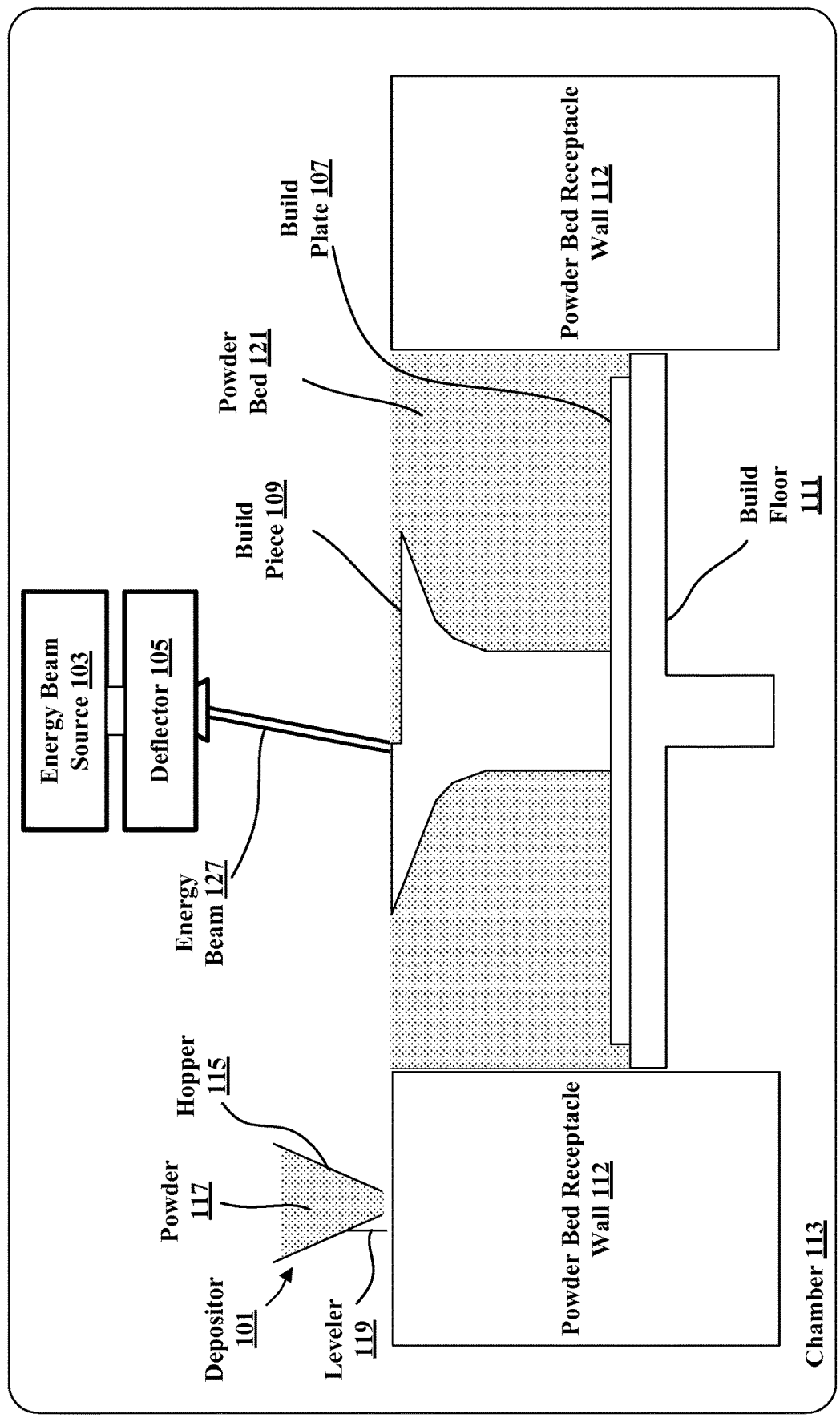

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various example embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
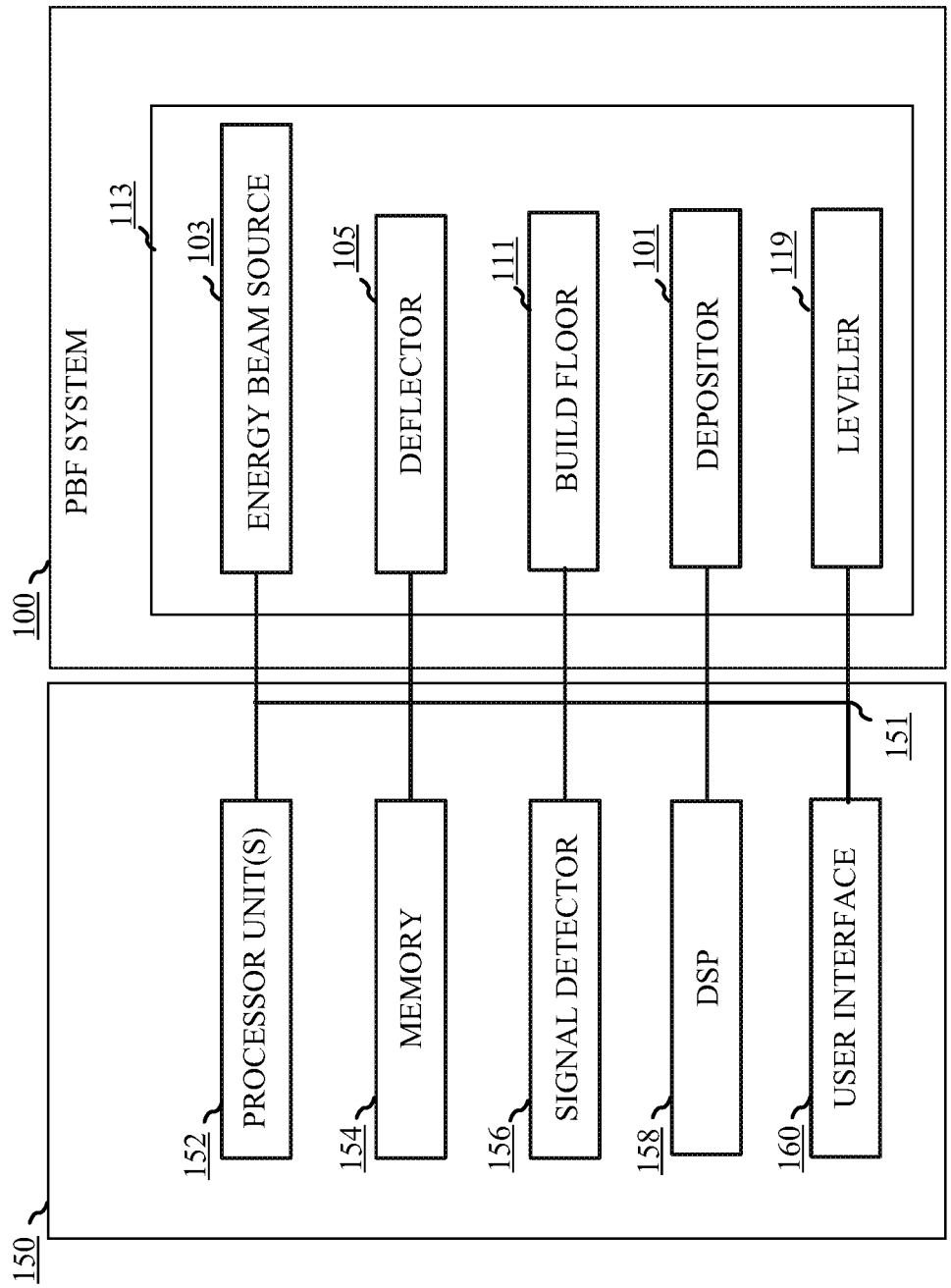
FIG. 1E illustrates a functional block diagram of a 3-D printer system in accordance with an aspect of the present disclosure.

FIG. 1E illustrates a functional block diagram of a 3-D printer system in accordance with an aspect of the present disclosure.

In an aspect of the present disclosure, control devices and/or elements, including computer software, may be coupled to PBF system 100 to control one or more components within PBF system 100. Such a device may be a computer 150, which may include one or more components that may assist in the control of PBF system 100. Computer 150 may communicate with a PBF system 100, and/or other AM systems, via one or more interfaces 151. The computer 150 and/or interface 151 are examples of devices that may be configured to implement the various methods described herein, that may assist in controlling PBF system 100 and/or other AM systems. In some arrangements, computer 150 or components thereof may be integrated with the PBF system 100.

In an aspect of the present disclosure, computer 150 may comprise at least one processor unit 152, memory 154, signal detector 156, a digital signal processor (DSP) 158, and one or more user interfaces 160. Computer 150 may include additional components without departing from the scope of the present disclosure.

The computer 150 may include at least one processor unit 152, which may assist in the control and/or operation of PBF system 100. The processor unit 152 may also be referred to as a central processing unit (CPU). Memory 154, which may include both read-only memory (ROM) and random access memory (RAM), may provide instructions and/or data to the processor 504. A portion of the memory 154 may also include non-volatile random access memory (NVRAM). The processor unit 152 typically performs logical and arithmetic operations based on program instructions stored within the memory 154. The instructions in the memory 154 may be executable (by the processor unit 152, for example) to implement the methods described herein.

The processor unit 152 may be implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor unit 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

The computer 150 may also include a signal detector 156 that may be used to detect and quantify any level of signals received by the computer 150 for use by the processor unit 152 and/or other components of the computer 150. The signal detector 156 may detect such signals as energy beam source 103 power, deflector 105 position, build floor 111 height, amount of powder 117 remaining in depositor 101, leveler 119 position, and other signals. The computer 150 may also include a DSP 158 for use in processing signals received by the computer 150. The DSP 158 may be configured to generate instructions and/or packets of instructions for transmission to PBF system 100.

The computer 150 may further comprise a user interface 160 in some aspects. The user interface 160 may comprise a keypad, a pointing device, and/or a display. The user interface 160 may include any element or component that conveys information to a user of the computer 150 and/or receives input from the user.

The various components of the computer 150 may be coupled together by an interface 151, which may be a bus system. The bus system interface 151 may include a data bus, for example, as well as a power bus, a control signal bus, and a status signal bus in addition to the data bus. Components of the computer 150 may be coupled together or accept or provide inputs to each other using some other mechanism.

Although a number of separate components are illustrated in FIG. 1E, one or more of the components may be combined or commonly implemented. For example, the processor unit 152 may be used to implement not only the functionality described above with respect to the processor unit 152, but also to implement the functionality described above with respect to the signal detector 156, the DSP 158, and/or the user interface 160. Further, each of the components illustrated in FIG. 1E may be implemented using a plurality of separate elements.

Figure 2:
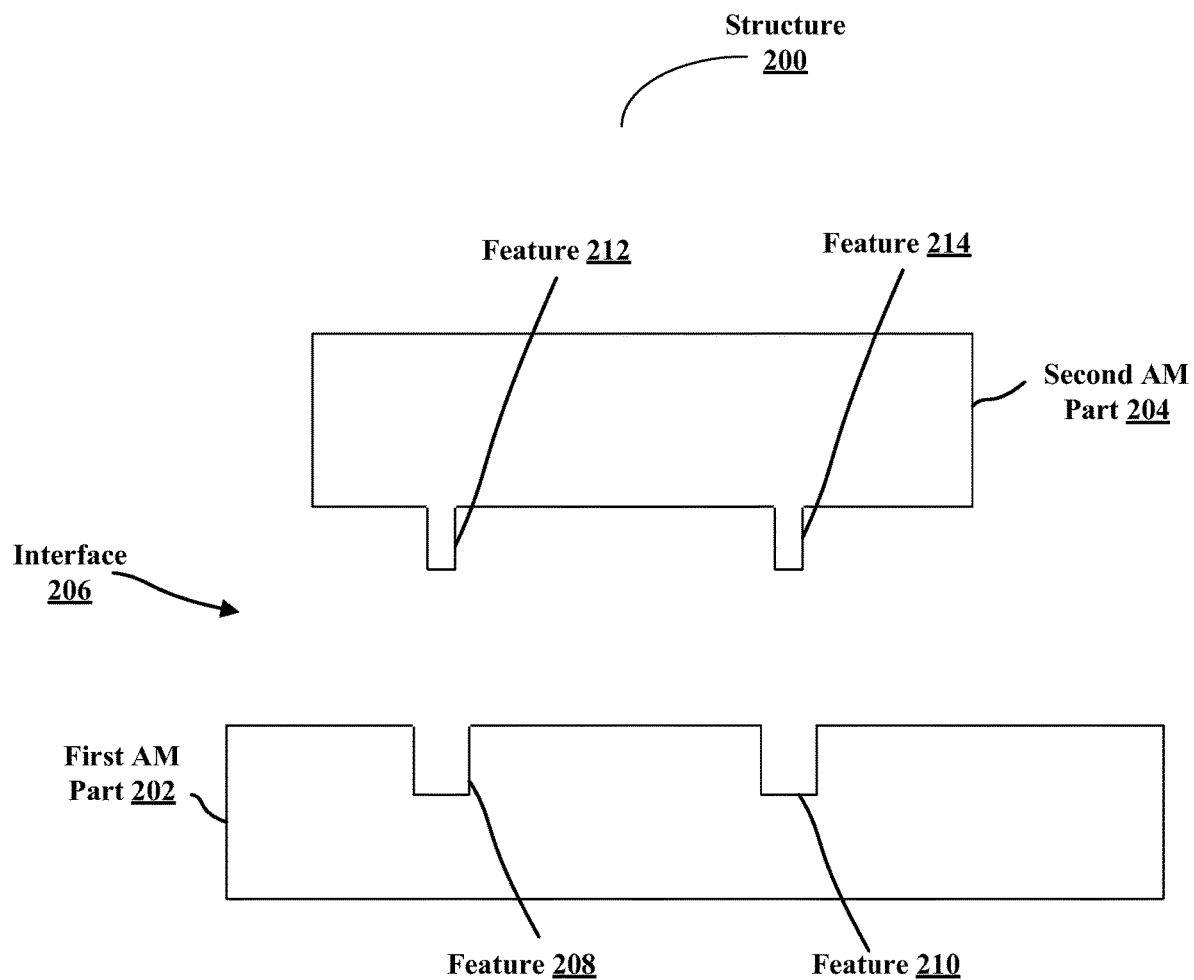
FIG. 2 is a cutaway view diagram illustrating a structure in accordance with an aspect of the present disclosure.

FIG. 2 is a cutaway diagram illustrating a structure in accordance with an aspect of the present disclosure.

In an aspect of the present disclosure, FIG. 2 illustrates a structure 200 which includes a first additively manufactured (AM) part 202 configured to couple to a second AM part 204 at interface 206. First AM part 202 and second AM part 204 may be coupled together via an adhesive, mechanical means, and/or a combination of adhesive and mechanical means, without departing from the scope of the present disclosure.

To facilitate coupling of first AM part 202 and second AM part 204, one or more features 208-214 may be included on first AM part 202 and/or second AM part 204. Features 208 and 210, as shown in FIG. 2, are illustrated as grooves, channels, or other indentations in first AM part 202, while features 212 and 214 are tongues, ridges, or elevations on second AM part 204. Each feature 208-214 may be an indentation into a part, or an elevation from a surface of a part, without departing from the scope of the present disclosure, so long as first AM part 202 and second AM part and their corresponding features, e.g., feature 208 and feature 212 shown in FIG. 2, can couple together as desired.

The first AM part 202 and/or the second AM part 204 may be a node, a subcomponent of a node, or any other type of component. The first AM part 202 and/or the second AM part 204 may be printed through any conventional means including PBF as described with respect to FIGS. 1A-1E, or any other AM methods. The AM parts may be performed using any technology suitable for use in PBF printing. These technologies may include, for example, selective laser melting (SLM), selective laser sintering (SLS), selective heat sintering (SHS), electron beam melting (EBM), direct metal laser sintering (DMLS), and others. In other embodiments, the AM part 202 may be printing using a different 3-D print technology such as fused deposition modeling (FDM). FDM AM may be ideal for printing various plastics, thermoplastics, etc. In general, the first AM part 202 and/or the second AM part 204 may be additively manufactured using any known AM technique or techniques.

One advantage of the use of AM in combining parts is that, due to the design flexibility of AM, the part 202 may include one or more various features that may, in turn, be used in conjunction with the adhesive-based part retention. For example, AM may be used to generate one or more features 208-214 that aid in alignment of first AM part 202 and second AM part 204, features that may carry adhesive to a location or locations (e.g., interface 206) where the first AM part 202 may be adhered to the second AM part 204, and/or a combination of features to allow for ease of connection of first AM part 202 and second AM part 204.

Furthermore, adhesive-based part retention may be combined with mechanical-based part retention. For example, primary adhesive-based part retention may be combined with mechanical-based part retention. Secondary adhesive-based part retention (e.g., holding parts together while a primary adhesive is applied, dries, and/or cures) may be combined with mechanical-based part retention. Some combination of primary adhesive-based part retention and secondary adhesive-based part retention may be combined with mechanical-based part retention. Mechanical-based part retention may include, for example, a groove that retains a snap-ring, screw and shim, spring-loaded clips, clips, a snap-like part retention element, snap-like part retention feature slidably engaging with a receptacle on an another part, a Christmas tree fastener, magnets, a tongue and groove connection, or other mechanical-based connections.

During manufacturing of the first AM part 202 and/or second AM part 204, there may be some small inaccuracies in the manufacturing of one or more of the parts. During coupling of these parts, then, any inaccuracies in manufacturing, e.g., within tolerance but not exactly at specification, inaccuracies in robot arm positioning, etc., may be reflected in the final assembly.

In an aspect of the preset disclosure, a part coupling process is disclosed that incorporates measurement-based corrections for geometric (part-based) inaccuracies and positioning (robot-based) inaccuracies. In such an aspect, a digital simulation of the assembly process can be used to control the actual assembly process. In some instances, robot offline programs (OLPs) may be employed to reduce and/or eliminate manual "touch-up" or adjustment of the programs, parts, or robot positioning during actual part assembly.

Assembly System

Figure 3:
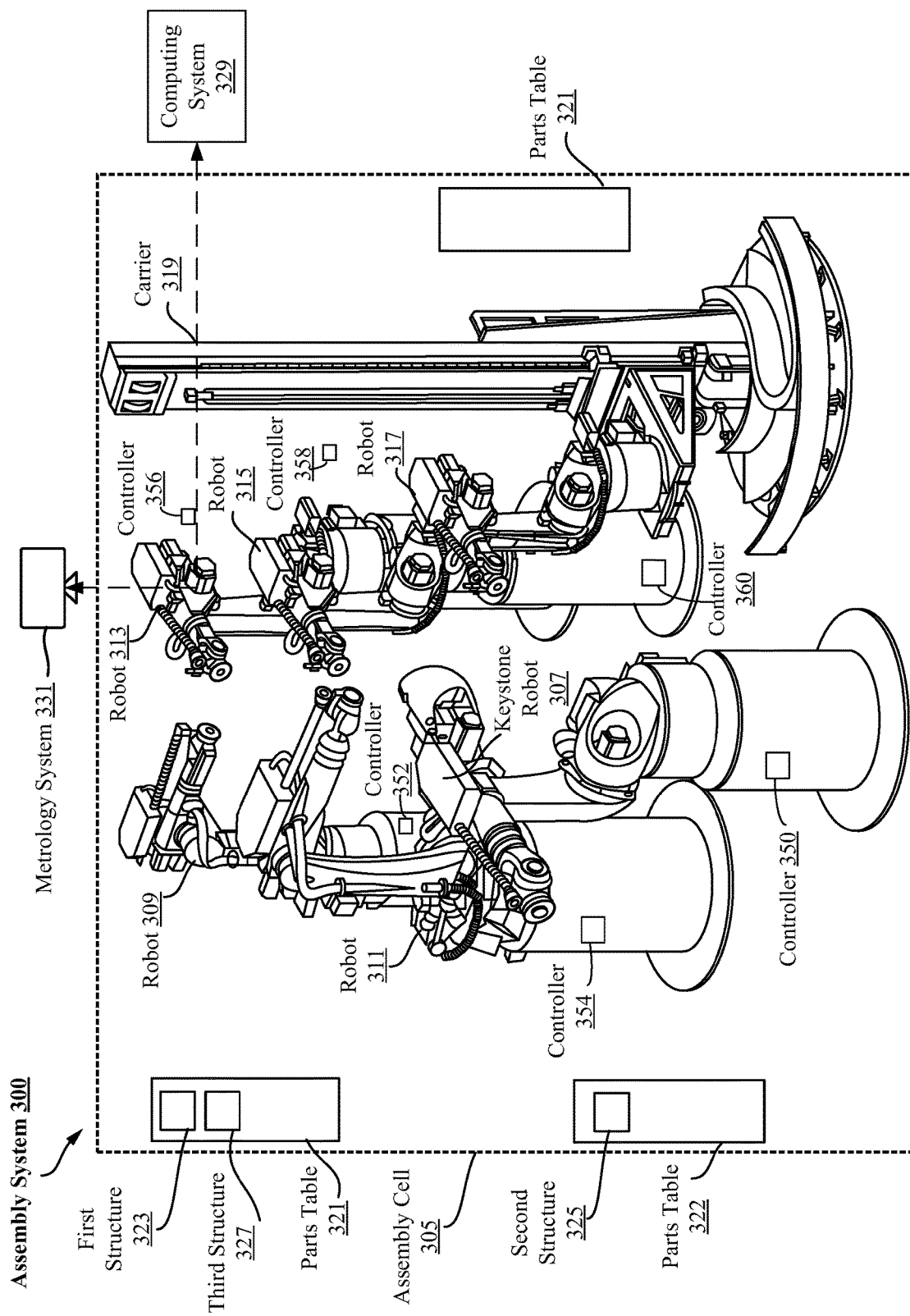
FIG. 3 illustrates a perspective view of an assembly system in accordance with an aspect of the present disclosure.

FIG. 3 illustrates a perspective view of an assembly system 300 in accordance with an aspect of the present disclosure.

In an aspect of the present disclosure, mechanical devices, such as robots, may assemble parts and/or structures in an automated and/or semi-automated manner. At least one of the at least two structures may be additively manufactured, e.g., as described with respect to FIGS. 1A-1E above. In some aspects, at least one of the at least two structures may be a piece, part, node, component, and/or other additively manufactured structure, which may include two structures that previously have been joined.

Structures to be joined in association with assembly of a vehicle may be additively manufactured with one or more features that may facilitate or enable various assembly operations (e.g., joining) as described with respect to FIG. 2. In an aspect of the present disclosure, an assembly system 300 may include two robots, at least one of which may be positioned to join one structure with another structure without the use of fixtures. Various assembly operations may be performed, potentially repeatedly, so that multiple structures may be joined for fixtureless assembly of at least a portion of a vehicle (e.g., vehicle chassis, body, panel, and the like).

A first robot may be configured to engage with and retain a first structure to which one or more other structures may be joined during various operations performed in association with assembly of at least a portion of an end product, such as a vehicle. For example, the first structure may be a section of a vehicle chassis, panel, base piece, body, frame, etc., whereas other structures may be other sections of the vehicle chassis, panel, base piece, body, frame, etc.

In an aspect of the present disclosure, the first robot may engage and retain a first structure that is to be joined with a second structure, and the second structure may be engaged and retained by a second robot. Various operations performed with the first structure (e.g., joining the first structure with one or more other structures, which may include two or more previously joined structures) may be performed at least partially within an assembly cell that includes a plurality of robots. Accordingly, at least one of the robots may be directed (e.g., controlled) during manipulation of the first structure in order to function in accordance with a precision commensurate with the joining operation.

The present disclosure provides various different embodiments of directing one or more robots at least partially within an assembly system for assembly operations (including pre- and/or post-assembly operations). It will be appreciated that various embodiments described herein may be practiced together. For example, an embodiment described with respect to one illustration of the present disclosure may be implemented in another embodiment described with respect to another illustration of the present disclosure.

As shown in FIG. 3, an assembly system 300 may be employed for component and/or part assembly. An assembly cell 305 may be configured at the location of fixtureless assembly system 300. Assembly cell 305 may be a vertical assembly cell. Within assembly cell 305, fixtureless assembly system 300 may include a set of robots 307, 309, 311, 313, 315, 317. Robot 307 may be referred to as a "keystone robot." Fixtureless assembly system 300 may include parts tables 321, 322 that can hold parts and structures for the robots to access. For example, a first structure 323, a second structure 325, and a third structure 327 may be positioned on one of parts tables 321, 322 to be picked up by the robots and assembled together. The weight and volume of the structures may vary without departing from the scope of the present disclosure. In various embodiments, one or more of the structures can be an additively manufactured structure, such as a complex node.

Assembly system 300 may also include a computing system 329 to issue commands to the various controllers of the robots of assembly cell 305, as described in more detail below. In this example, computing system 329 is communicatively connected to the robots through a wireless communication network. Fixtureless assembly system 300 may also include a metrology system 331 that can accurately measure the positions of the robotic arms of the robots and/or the structures held by the robots. Computing system 329 and/or metrology system 331 may be controlled by and/or part of computer 150 as described with respect to FIG. 1E herein.

Keystone robot 307 may include a base and a robotic arm. The robotic arm may be configured for movement, which may be directed by computer-executable instructions loaded into a processor communicatively connected with keystone robot 307. Keystone robot 307 may contact a surface of assembly cell 305 (e.g., a floor of the assembly cell) through the base.

Keystone robot 307 may include and/or be connected with an end effector and/or fixture that is configured to engage and retain a first structure, part, and/or component.

An end effector may be a component configured to interface with at least one structure. Examples of the end effectors may include jaws, grippers, pins, and/or other similar components capable of facilitating fixtureless engagement and retention of a structure by a robot. A fixture may also be employed by keystone robot 307 to engage and retain a first structure, part, and/or component.

For example, a structure may be co-printed with one or more features that increase the strength of the structure, such as a mesh, honeycomb, and/or lattice arrangement. Such features may stiffen the structure to prevent unintended movement of the structure during the assembly process. In another example, a structure may be co-printed or additively manufactured with one or more features that facilitates engagement and retention of the structure by an end effector, such as protrusion(s) and/or recess(es) suitable to be engaged (e.g., "gripped") by an end effector. The aforementioned features of a structure may be co-printed with the structure and therefore may be of the same material(s) as the structure.

In retaining the first structure, keystone robot 307 may position (e.g., move) the first structure; that is, the position of the first structure may be controlled by keystone robot 307 when retained by the keystone robot. Keystone robot 307 may retain the first structure by "holding" or "grasping" the first structure, e.g., using an end effector of a robotic arm of the keystone robot 307 and/or using a fixture to maneuver the first structure. For example, keystone robot 307 may retain the first structure by causing gripper fingers, jaws, and the like to contact one or more surfaces of the first structure and apply sufficient pressure thereto such that the keystone robot controls the position of the first structure. That is, the first structure may be prevented from moving freely in space when retained by keystone robot 307, and movement of the first structure may be constrained by the keystone robot 307.

As other structures (including subassemblies, substructures of structures, etc.) are connected to the first structure, keystone robot 307 may retain the engagement with the first structure. The aggregate of the first structure and one or more structures connected thereto may be referred to as a structure itself, but may also be referred to as an "assembly" or a "subassembly" herein. Keystone robot 307 may also retain an engagement with an assembly once the keystone robot has engaged the first structure.

In some embodiments, robots 309 and 311 of assembly cell 305 may be similar to keystone robot 307, and thus may include respective end effectors and/or fixtures configured to engage with structures that may be connected with the first structure when retained by the keystone robot 307. In some embodiments, robots 309, 311 may be referred to as "assembly robots" and/or "materials handling robots."

In some embodiments, robot 313 of assembly cell 305 may be used to effect a structural connection between the first structure and the second structure. Robot 313 may be referred to as a "structural adhesive robot." Structural adhesive robot 313 may be similar to the keystone robot 307, except the structural adhesive robot may include a tool at the distal end of the robotic arm that is configured to apply structural adhesive to at least one surface of structures retained by the keystone robot 307 and/or assembly robots 309, 311. Application of the structural adhesive may occur before or after the structures are positioned at joining proximities with respect to other structures for joining with the other structures. The joining proximity can be a position that allows a first structure to be joined to a second structure. For example, in various embodiments, the first and second structures may be joined through the application of an adhesive while the structures are within their joining proximity.

However, structural adhesives might take a relatively long time to cure. If this is the case, the robots retaining the first and second structures, for example, might have to hold the structures at the joining proximity for a long time. This would prevent the robots from being used for other tasks, such as continuing to pick up and assemble structures, for an extended time while the structural adhesive cures. In order to allow more efficient use of the robots, a quick-cure adhesive may be additionally applied in some embodiments to join the structures quickly and retain the structures so that the structural adhesive can cure without requiring both robots to hold the structures during curing.

In an aspect of the present disclosure, robot 315 of fixtureless assembly system 300 may be used to apply a quick-cure adhesive. In such an aspect, a quick-cure UV adhesive may be used, and robot 315 may be referred to as a "UV robot." UV robot 315 may be similar to keystone robot 307, except the UV robot may include a tool at the distal end of the robotic arm that is configured to apply a quick-cure UV adhesive and to cure the adhesive, e.g., when the structures are positioned within the joining proximity. That is, UV robot 315 may cure an adhesive after the adhesive is applied to the first structure and/or second structure when the structures are within the joining proximity of the robotic arms of keystone robot 307 and/or assembly robots 309, 311.

In an aspect of the present disclosure, one or more of the robots 307, 309, 311, 313, 315, and 317 may be used for multiple different roles. For example, robot 317 may perform the role of an assembly robot, such as assembly robots 309, 311, and the role of a UV robot, such as UV robot 315. In this regard, robot 317 may be referred to as an "assembly/UV robot." Assembly/UV robot 317 may offer functionality similar to each of the assembly robots 309, 311 when the distal end of the robotic arm of the assembly/UV robot includes an end effector (e.g., connected by means of a tool flange). However, assembly/UV robot 315 may offer multi-functional capabilities similar to UV robot 315 when the distal end of the robotic arm of the assembly/UV robot includes a tool configured to applied UV adhesive and to emit UV light to cure the UV adhesive.

The quick-cure adhesive applied by UV robot 315 and assembly/UV robot 317 may provide a partial adhesive bond in that the adhesive may be used to hold the relative positions of a first structure and a second structure within the joining proximity until the structural adhesive is applied to permanently join them. The adhesive providing the partial adhesive bond may be removed thereafter (e.g., as with temporary adhesives) or not (e.g., as with complementary adhesives).

In a fixtureless assembly system 300, at least one surface of the first structure and/or second structure to which adhesive is to be applied may be determined based on gravity or other load-bearing forces on various regions of the assembly. Finite element method (FEM) analyses may be used to determine the at least one surface of the first structure and/or the second structure, as well as one or more discrete areas on the at least one surface, to which the adhesive is to be applied. For example, FEM analyses may indicate one or more connections of a structural assembly that may be unlikely or unable to support sections of the structural assembly disposed about the one or more connections.

In assembling at least a portion of a vehicle in assembly cell 305, the second structure may be joined directly to the first structure by directing the various robots 307, 309, 311, 313, 315, and 317 as described herein. Additional structures may be indirectly joined to the first structure. For example, the first structure may be directly joined to the second structure through movement(s) of keystone robot 307, structural adhesive robot 313, at least one assembly robot 309, 311, and/or UV robot 315. Thereafter, the first structure, joined with the second structure, may be indirectly joined to an additional structure as the additional structure is directly joined to the second structure. Thus, the first structure, which may continue to be retained by keystone robot 307, may evolve throughout an assembly process as additional structures are directly or indirectly joined to it.

In an aspect of the present disclosure, assembly robots 309, 311 may join two or more structures together, e.g., with a partial, quick-cure adhesive bond, before joining those two or more structures with the first structure retained by keystone robot 307. The two or more structures that are joined to one another prior to being joined with a structural assembly may also be a structure, and may further be referred to as a "subassembly." Accordingly, when a structure forms a portion of a structural subassembly that is connected with the first structure through movements of keystone robot 307, structural adhesive robot 313, at least one assembly robot 309, 311, and UV robot 315, a structure of the structural subassembly may be indirectly connected to the first structure when the structural subassembly is joined to a structural assembly including the first structure.

In an aspect of the present disclosure, the structural adhesive may be applied, e.g., deposited in a groove of one of the structures, before the first and second structures are brought within the joining proximity. For example, structural adhesive robot 313 may include a dispenser for a structural adhesive and may apply the structural adhesive prior to the structures being brought within the joining proximity. A structural adhesive may be applied after a structural assembly is fully constructed (that is, once each structure of the portion of the vehicle is joined to the first structure). For example, the structural adhesive may be applied to one or more joints or other connections between the first structure and the second structure. The structural adhesive may be applied at a time after the last adhesive curing by the UV robot 315 is performed. The structural adhesive may also be applied separately from fixtureless assembly system 300.

In an aspect of the present disclosure, one or more of robots 307, 309, 311, 313, 315, 317 may be secured to a surface of assembly cell 305 through a respective base of each of the robots. For example, one or more of the robots may have a base that is bolted to the floor of the assembly cell 305. In various other embodiments, one or more of the robots may include or may be connected with a component configured to move the robot within assembly cell 305. For example, a carrier 319 in assembly cell 305 may be connected to assembly/UV robot 317.

Each of the robots 307, 309, 311, 313, 315, 317 may be communicatively connected with a controller, such as a respective one of controllers 350, 352, 354, 356, 358, 360.

Each of controllers 350, 352, 354, 356, 358, 360 may include, for example, a memory and a processor communicatively connected to the memory (e.g., similar to memory 154 as described with respect to FIG. 1E). According to some other embodiments, one or more of controllers 350, 352, 354, 356, 358, 360 may be implemented as a single controller that is communicatively connected to one or more of the robots controlled by the single controller.

Computer-readable instructions for performing fixtureless assembly can be stored on the memories of controllers 350, 352, 354, 356, 358, 360 and the processors of the controllers can execute the instructions to cause robots 307, 309, 311, 313, 315, 317 to perform various operations. Such computer-readable instructions may be stored as non-transitory computer readable code, and may be stored on computer-readable medium such as disks, solid-state memory, computer hard drives, or other computer-readable medium, without departing from the scope of the present disclosure.

Controllers 350, 352, 354, 356, 358, 360 may be communicatively connected to one or more components of an associated robot 307, 309, 311, 313, 315, or 317, for example, via a wired (e.g., bus or other interconnect) and/or wireless (e.g., wireless local area network, wireless intranet) connection. Each of the controllers may issue commands, requests, etc., to one or more components of the associated robots, for example, in order to perform various operations.

In an aspect of the present disclosure, controllers 350, 352, 354, 356, 358, 360 may issue commands, etc., to a robotic arm of the associated robot 307, 309, 311, 313, 315, or 317 and, for example, may direct the robotic arms based on a set of absolute coordinates relative to a global cell reference frame of assembly cell 305. In various embodiments, controllers 350, 352, 354, 356, 358, 360 may issue commands, etc., to tools connected to the distal ends of the robotic arms. For example, the controllers may control operations of the tool, including depositing a controlled amount of adhesive on a surface of the first structure or second structure by an adhesive applicator, exposing adhesive deposited between structures to UV light for a controlled duration by a curing tool, and so forth. In various embodiments, controllers 350, 352, 354, 356, 358, 360 may issue commands, etc., to end effectors at the distal ends of the robotic arms. For example, the controllers may control operations of the end effectors, including, engaging, retaining, and/or manipulating a structure.

According to various other aspects, a computing system, such as computing system 329, similarly having a processor and memory, may be communicatively connected with one or more of controllers 350, 352, 354, 356, 358, 360. In various embodiments, the computing system may be communicatively connected with the controllers via a wired and/or wireless connection, such as a local area network, an intranet, a wide area network, and so forth. In some embodiments, the computing system may be implemented in one or more of controllers 350, 352, 354, 356, 358, 360. In some other embodiments, the computing system may be located outside assembly cell 305, e.g., as part of computer 150 described with respect to FIG. 1E.

The processor of the computing system may execute instructions loaded from memory, and the execution of the instructions may cause the computing system to issue commands, etc., to the controllers 350, 352, 354, 356, 358, 360, such as by transmitting a message including the command, etc., to one of the controllers over a network connection or other communication link.

According to some embodiments, one or more of the commands may indicate a set of coordinates and may indicate an action to be performed by one of robots 307, 309, 311, 313, 315, 317 associated with the one of the controllers that receives the command. Examples of actions that may be indicated by commands include directing movement of a robotic arm, operating a tool, engaging a structure, rotating and/or translating a structure, and so forth. For example, a command issued by a computing system may cause controller 352 of assembly robot 309 to direct a robotic arm of assembly robot 309 so that the distal end of the robotic arm may be located based on a set of coordinates that is indicated by the command.

The instructions loaded from memory and executed by the processor of the computing system, which cause the controllers to control actions of the robots may be based on computer-aided design (CAD) data. For example, a CAD model of assembly cell 305 (e.g., including CAD models of the physical robots) may be constructed and used to generate the commands issued by the computing system.

In some embodiments, one or more CAD models may represent locations corresponding to various elements within the assembly cell 305. Specifically, a CAD model may represent the locations corresponding to one or more of robots 307, 309, 311, 313, 315, 317. In addition, a CAD model may represent locations corresponding to structures and repositories of the structures (e.g., storage elements, such as parts tables, within fixtureless assembly system 300 at which structures may be located before being engaged by an assembly robot). In various embodiments, a CAD model may represent sets of coordinates corresponding to respective initial or base positions of each of robots 307, 309, 311, 313, 315, 317.

Global Position Joining

Figure 4:
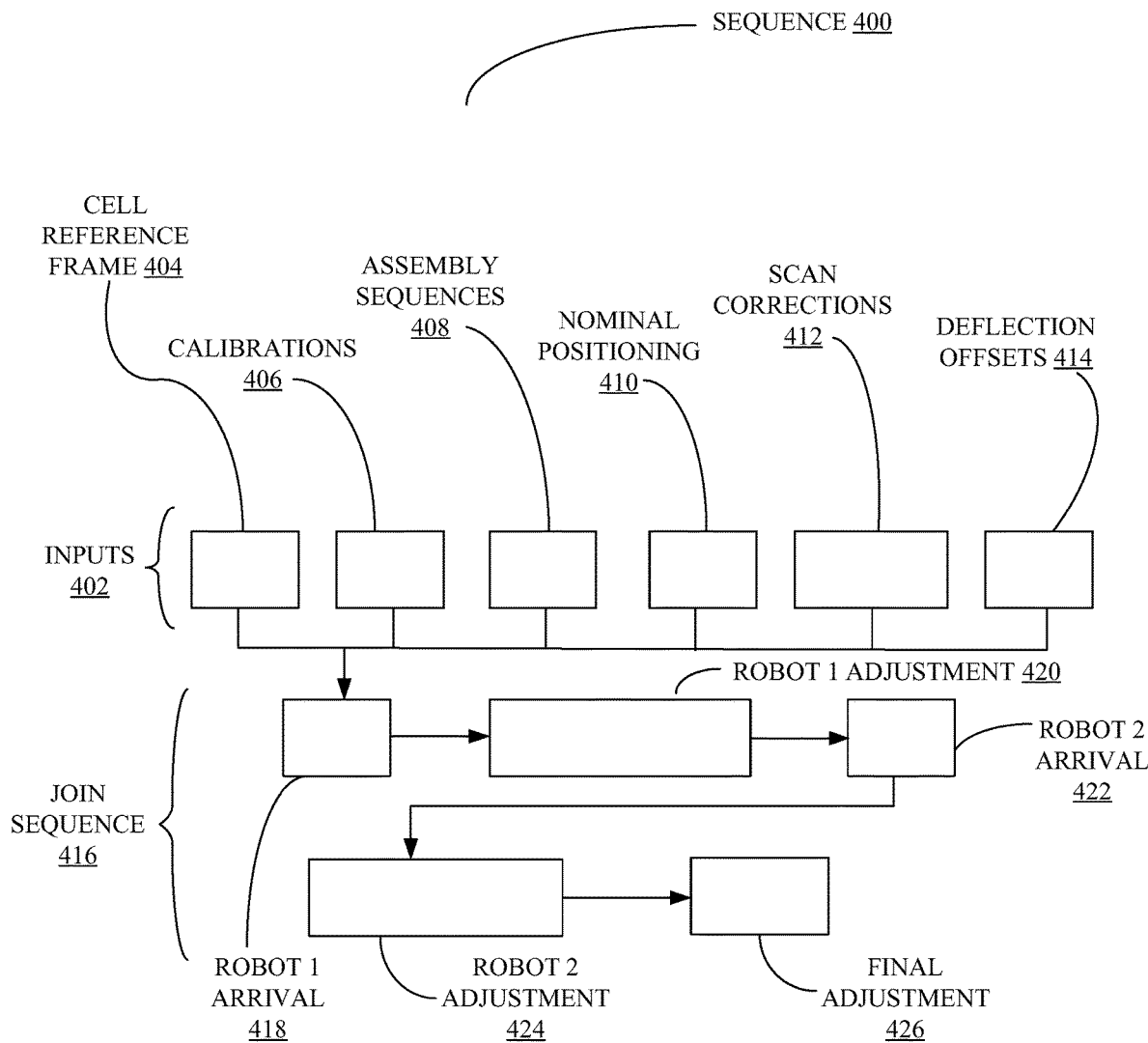
FIG. 4 illustrates an assembly input and flow diagram in accordance with an aspect of the present disclosure.

FIG. 4 illustrates an assembly input and flow diagram in accordance with an aspect of the present disclosure.

In an aspect of the present disclosure, a global position joining sequence 400 may be implemented to describe how two (or more) robots join parts (also known as assemblies, nodes, or components) together. A global position joining sequence in accordance with an aspect of the present disclosure may involve the robots executing a real-time, metrology-corrected move sequence to a programmed join and/or approach position.

Sequence 400 includes inputs 402, which may include a cell reference frame 404, calibrations 406, assembly sequences 408, nominal positioning 410, scan corrections 412, and deflection offsets 414. Other inputs 402 may be employed within sequence 400, such as best-fit analysis for sequence 400, without departing from the scope of the present disclosure.

Once inputs 402 are received, one or more robots may execute join sequence 416. Join sequence 416 may include robot 1 arrival 418, robot 1 adjustment 420, robot 2 arrival 422, robot 2 adjustment 424, and final adjustment 426. Other functions and/or actions may be employed within join sequence 416 without departing from the scope of the present disclosure.

When using robots for assembly of components, e.g., as discussed with respect to FIG. 3, the robots, e.g., robots 307, 309, 311, 313, 315, and/or 317 may coordinate movements to properly position each component for assembly. Cell reference frame 404 may include the overall reference coordinates for the assembly procedure for the robots. Such coordinates may include a zero reference point for one or more robots, distances between robot coupling points and edges of parts, etc., such that a common reference framework may be provided to the assembly.

The cell reference frame 404 may be the origin coordinate frame common to all objects in both a virtual assembly cell and the "physical" assembly cell 305. The cell reference frame 404 may be derived from the geometries of and relationships between specific objects in the assembly cell 305. In the virtual assembly cell, a reference frame may be defined using nominal digital definitions of the object geometries and their locations (i.e., CAD inputs). In the physical assembly cell, the cell reference frame 404 may be computed based on measurements of the same objects used to define the virtual assembly cell. The objects that are used to define the reference frame are chosen based on their capacity to enable accurate measurements in the physical assembly cell 305. In addition to measuring the objects that are used to compute the cell reference frame 404, additional measurement targets may be added to the physical cell and measured relative to said frame. This may be done to enable the locating of measurement instruments relative to the cell reference frame 404 when the instrument is unable to measure the original reference objects directly.

In an aspect of the present disclosure, e.g., when using CAD modeling, a reference frame for a coordinate system may be defined. The coordinate system may include absolute coordinates, relative coordinates, or a combination thereof. For a set of absolute coordinates, the cell reference frame 404 may be a global coordinate frame or global reference frame, and the cell reference frame 404 may include (e.g., may be bounded by and/or may be defined by) assembly cell 305.

The cell reference frame 404 may be established based on one or more ground references in assembly cell 305—such as one or more laser prisms, each of which may be measured in the assembly cell 305 such that, in the aggregate, a reference frame is defined with a number of reference points corresponding to the number of laser prisms. In an aspect of the present disclosure, a CAD model corresponding to assembly cell 305 may be an as-built CAD model, which may represent the assembly cell 305 more accurately than a nominal CAD model. Absolute coordinates based on CAD modeling may provide a degree of accuracy that is acceptable for assembly within sequence 400. For example, directing robots 307, 309, 311, 313, 315, 317 based on a cell reference frame 404 that includes absolute coordinates established through CAD modeling may adhere to various industry and/or safety standards that are to be observed during sequence 400.

In an aspect of the present disclosure, cell reference frame 404 may include relative coordinates that may be used for assembly system 300 as an alternative or supplement to an absolute coordinate system. In particular, relative coordinates may be used for some portions of sequence 400 in which a second structure may be joined to the first structure and/or joined to another structure. For example, a controller associated with an assembly robot may direct the robotic arm of the robot to a joining position based on a set of absolute and/or relative coordinates defined with respect to the cell reference frame 404. Although various example reference frames are disclosed herein, one skilled in the art readily understands that other reference frames can be used and that any given position is inherently determined within some reference frame.

Calibrations 406 may include the distance each portion of the robot moves per input, the relative position of the robotic arm with respect to the cell reference frame 404, etc. Calibrations 406 may be measured (e.g., by the controller of the robot, by the controller of another robot, by another controller and/or processing system, etc.) after a given robot reaches the joining position based on the set of absolute coordinates, and the measured positions may be stored or updated over time. One or more controllers may position the robotic arm of a given robot based on the measured position, measured relative position, etc., of that robot's arm in the cell reference frame 404 and/or with respect to the position of another robot's robotic arm. Thus, a single correction to one robot may be performed instead of correcting multiple robot positions through calibrations 406.

Robot calibration 406 may also include measuring the position and orientation of a robot base relative to the cell reference frame 404, and the robot tool relative to other parts of the robot, e.g., the robot flange, etc. Robot calibration 406 may involve exercising the robot through a range of positions, taking measurements of the robot tool at each position, then computing the position and orientation of the base and robot arm and/or tool to reduce any errors between the measured and commanded positions. These calibrations may then be stored in the robot memory under the same base and tool numbers that are used in robot offline programs (OLPs). In an aspect of the present disclosure, the virtual assembly cell remains fixed with the nominal definitions of each robot and tool, while each physical cell constructed contains unique base and tool robot calibrations 406 that are stored for each robot. When the robot OLPs generated by the digital simulation are executed in the physical assembly cell 305, the calibrated robot bases and tools are used, resulting in robot tool positioning in the physical cell that matches what was defined in the virtual cell.

Assembly sequences 408 may include the commands given by the controllers that move the robots during join sequence 416.

Nominal positioning 410 may describe or include the nominal, general, and or approximate positioning and/or approaches made by the robot arms when preparing for final assembly and/or joining of components.

The nominal positions, approaches, and orientations of the robots for a joining procedure 416 may be defined in a digital simulation with respect to the cell reference frame 404. A joining procedure 416 may include a male part joint being inserted into a female part joint along a linear path, so minor corrections to the nominal positions and/or orientations may be employed to increase accuracy of such a procedure. As such, an approach position may be defined that positions the tongue outside of the groove by a certain distance, e.g., 2 mm, etc., along the axis of the groove depth and/or at the center of the groove length and width.

Scan corrections 412 may describe or include corrections to the nominal positioning 410 inputs, which may be determined through measurement of robot arms relative positioning, measurement of a robot arm position relative to a component edge, or other corrective measurements made during join sequence 416.

Deflection offsets 414 may include or describe corrective movements that account for deflection of components when being manipulated by one or more robots. For example, a component may be contacted by a robot arm in such a way that the weight of the component deflects and/or sags the component in a certain direction. Deflection offsets may take such deflections into account when positioning robot arms during join sequence 416. Deflection offsets 414 may also take into account gravity, moment arms, etc. and the effects of gravity on the various components being assembled.

Once inputs 402 are received (e.g., by robots 307, 309, 311, 313, 315, and/or 317 and/or controllers 350, 352, 354, 356, 358, and/or 360, join sequence 416 responds to the various inputs 402 by manipulating the robot arms and/or components in accordance with the applicable inputs 402 for a given portion of join sequence 416.

Robot 1 arrival 418 is a response by a robot, e.g., robot 307, to inputs 402 that controls a robotic arm of robot 1, e.g., robot 307, to move a first component (i.e., structure, part, etc.) engaged by the robotic arm to an arrival location within cell reference frame 404. Arrival location is a target position of the first component from which the first component will be joined with a second component. In an aspect of the present disclosure, robot 1 is positioning a first component that will be joined to the second component, where the second component is being positioned by the robotic arm of another robot, e.g., robot 2. In various embodiments, the robotic arms may be part of the same robot.

Robot 1 adjustment 420 is a response by robot 1 to adjust the position of robot 1's robotic arm to compensate for a difference between an actual, e.g., measured, position and the target position, which may place the first component in a more precise location for when the two components will be joined together. Robot 1 adjustment 420 may include, for example, measuring the component at the target position, then performing an operation including determining a difference between the measured position and the target position, determining whether the difference exceeds a tolerance, and if the difference exceeds the tolerance, controlling robot 1 move its robotic arm to move the first component to compensate for the difference. In various embodiments, measuring the component at the target location may be performed by controlling a measurement device, such as a laser interferometer, optical scanner, etc., to perform a measurement. In various embodiments, the measurement device may measure the position of the component directly, that is, by sensing the component itself, or portion(s) thereof. For example, an optical scanner may take a picture of the component at the target location and measure its actual position based on image processing of the component image. In various embodiments, the measurement device may measure the position of the component indirectly, that is, by sensing something other than the component itself. For example, a laser interferometer may sense the position(s) of marker(s) fixed to the distal end of the robot close to the component. The measurement device may infer the position of the component based on the sensed position(s) of the marker(s). One skilled in the art would readily understand there are many ways to measure the actual position of the component and would readily understand that "position" may include the orientation of the component in space. In the present example, robot 1 adjustment 420 may apply to "female" components, e.g., first AM part 202 having grooves or features such as features 212 and 214. A more detailed description of Robot 1 adjustment 420 is described with respect to FIGS. 6-9.

Robot 2 arrival 422 is a response by a robot, e.g., robot 309, to inputs 402 that moves robot 2, e.g., robot 309, to an arrival location within cell reference frame 404. This arrival location is a target position of the second component from which the second component will be joined with the first component.

Robot 2 adjustment 424 is a response by robot 2 to adjust the position of robot 2's robotic arm to compensate for a difference between an actual, e.g., measured, position and the target position, which may place the first component in a more precise location for when the two components will be joined together. Robot 2 adjustment 424 may include a similar process as robot 1 adjustment 420 described above. In the present example, robot 2 adjustment 424 may apply to "male" components, e.g., second AM part 204 having tongues or features such as features 212 and 214. A more detailed description of Robot 2 adjustment 424 is described with respect to FIGS. 6-9.

Final adjustment 426 may include moving the first component and/or the second component to join the two components, i.e., moving only the first component towards the second component, moving only the second component towards the first component, or moving both components towards each other. Final adjustment (also known as a "join") 426 may include moving the components into the positions at which they will be fixed together, but not include the final fixing step. For example, if the two components are to be welded together, join 426 may include moving the component(s) into the welding position, but not include the welding operation itself.

In various embodiments, the components may be joined and fixed together with adhesive. The adhesive may be applied to one or both of the components before they are moved to the target positions, for example. In another example, the adhesive may be applied after the components have be brought together to be joined, i.e., after join 426. In another example, adhesive may be applied after one or both of the components are moved to the target position(s). In various embodiments, the components may be welded, bolted, clamped, etc., together after join 426.

By way of illustration, movements of the assembly robot and the structural adhesive robot within the reference frame of assembly cell 305 may be simulated in order to model absolute coordinates (and, optionally, times) for operations of the assembly robot and the structural adhesive robot. For example, a CAD model may simulate three operations: (1) a first time and first set of coordinates for fixtureless engagement of a structure positioned on a parts table by an end effector of an assembly robot, (2) a second time and second set of coordinates for directing the assembly robot to position the structure proximate to a structural adhesive robot for application of an adhesive, and (3) a third time and third set of coordinates for directing the structural adhesive robot to apply adhesive to a surface of the structure. Subsequently, the example simulated operations may be translated to one or more sets of discrete instructions, which may be loaded into memory of one or more controllers communicatively connected to the assembly and structural adhesive robots. When executed by the processors of the respective controllers, the sets of discrete instructions may cause the robots in fixtureless assembly system 300 to perform the operations simulated through the CAD model.

Each of robots 307, 309, 311, 313, 315, 317 may include features that are common across all or some of the robots. For example, all of the robots may include a base, each of which having a surface (e.g., a bottom surface) that contacts assembly cell 305 (e.g., rests on or is secured to a floor of the assembly cell). Each base may have another surface (e.g., a top surface and/or a surface disposed on the base opposite from the surface contacting assembly cell 305) and, at a respective other surface, a base may connect with a proximal end of a respective robotic arm of a respective one of the robots.

In some embodiments, a base may be connected to the proximal end of a robotic arm through at least one rotation and/or translation mechanism. The at least one rotation and/or translation mechanism may provide at least one degree of freedom in movement of an end effector or other tool of the robotic arm. Correspondingly, the at least one rotation and/or translation mechanism may provide at least one degree of freedom in movement of a structure that is engaged and retained by an end effector or other tool of the robotic arm.

Each robotic arm of robots 307, 309, 311, 313, 315, 317 may include a distal end, oppositely disposed from the proximal end of the robotic arm. As described herein, each robotic arm of each of the robots may include an end effector and/or a tool, such as an adhesive application tool, curing tool, and so forth. An end effector or a tool may be at the distal end of a robotic arm. In some embodiments, the distal end of a robotic arm may be connected to an end effector or a tool (or tool flange) through at least one rotation and/or translation mechanism, which may provide at least one degree of freedom in movement of the tool and/or movement of a structure engaged and retained by the tool of the robotic arm.

In some embodiments, the distal end of a robotic arm may include a tool flange, and a tool included at the tool flange; for example, a tool may be connected to the distal end of a robotic arm by means of the tool flange. A tool flange may be configured to include a plurality of tools. In this way, for example, the assembly/UV robot 317 may offer functionality similar to each of the assembly robots 309, 311 when a distal end of a robotic arm of the assembly/UV robot 317 includes an end effector (e.g., connected by means of the tool flange). In addition, the assembly/UV robot 317 may offer functionality similar to the UV robot 315 when the distal end of the robotic arm of the assembly/UV robot 317 includes a tool configured to apply UV adhesive and to emit UV light to cure the adhesive.

According to some embodiments, a tool flange and/or tool may provide one or more additional degrees of freedom for rotation and/or translation of a structure engaged and retained by the tool. Such additional degrees of freedom may supplement the one or more degrees of freedom provided through one or more mechanisms connecting a base to the proximal end of a robotic arm and/or connecting the distal end of a robotic arm to the tool (or tool flange). Illustratively, a robotic arm of at least one of robots 307, 309, 311, 313, 315, 317 may include at least one joint configured for rotation and/or translation at a distal and/or proximal end, such as an articulating joint, a ball joint, and/or other similar joint.

One or more of the respective connections of robots 307, 309, 311, 313, 315, 317 (e.g., one or more rotational and/or translational mechanisms connecting various components of one of the robots), a respective tool flange, and/or a respective tool may provide at least a portion (and potentially all) of six degrees of freedom (6DoF) for a structure engaged and retained by the robots. The 6DoF may include forward/backward (e.g., surge), up/down (e.g., heave), left/right (e.g., sway) for translation in space and may further include yaw, pitch, and roll for rotation in space. Access to various portions of a structure may be attainable through one or more of the 6DoF, as opposed to retention of a structure using a fixture, which cannot offer 6DoF in movement of a structure and also blocks access to an significant portion of a structure attached thereto.

In assembly systems including fixtures, positioners, and/or fixture tables, 6DoF may be unattainable during the assembly process, for example, because at least one of the fixture, positioner, and/or fixture table may prevent one or more of surge, heave, sway, yaw, pitch, and/or roll of a structure to which the fixture is attached. Coupled with the reduction in available space commensurate with use of a fixture, positioner, and/or fixture table for accessing and/or manipulating a structure, the unattainable one(s) of the 6DoF may render some significant portions of the structure inaccessible.

The inaccessibility of portions of the structure make the assembly process of a vehicle difficult. For example, the inaccessibility of a surface of a structure at which another structure is to be joined may render a structural assembly unsuitable for use in a vehicle that is to meet various industry and/or safety standards for commercial and/or consumer vehicles.

In contrast, fixtureless robotic operations for constructing a structural assembly as described herein (e.g., with respect to the fixtureless assembly system 300) may feature a greater number of degrees of freedom (e.g., all 6DoF) than assembly systems that rely on fixtures, positioners, and/or fixture tables. Commensurately, fixtureless robotic operations (e.g., fixtureless assembly system 300) may reduce the complexities and/or difficulties otherwise inherent with the manipulation and/or accessibility of a structure, thereby increasing the likelihood that a structural assembly derived through fixtureless assembly system 300 may meet various industry and/or safety standards.

Controlling robots with more than three degrees of freedom to position components in space to be joined accurately can be difficult. In particular, in the automotive industry the tolerances for vehicle assemblies can be difficult to achieve using robots with more than 3 degrees of freedom. However, robots with more high degrees of freedom allow for more flexible assembly operations. In other words, assembly robots with lower degrees of freedom may be moved with more accuracy movement is constrained in certain degrees, these robots do not have the flexibility to change between different assemblies, which may require piecing together parts in different ways than the robot can move. On the other hand, higher degree of freedom robots may be more flexible because they can move in more ways, but the increased degrees of freedom may make these robots less accurate to position parts. Aspects of the present disclosure include controlling robots with more than three degrees of freedom to accurately join parts. In various embodiments, robotic arms may have 4, 5, or even 6 degrees of freedom.

Relative Position Joining

Figure 5:
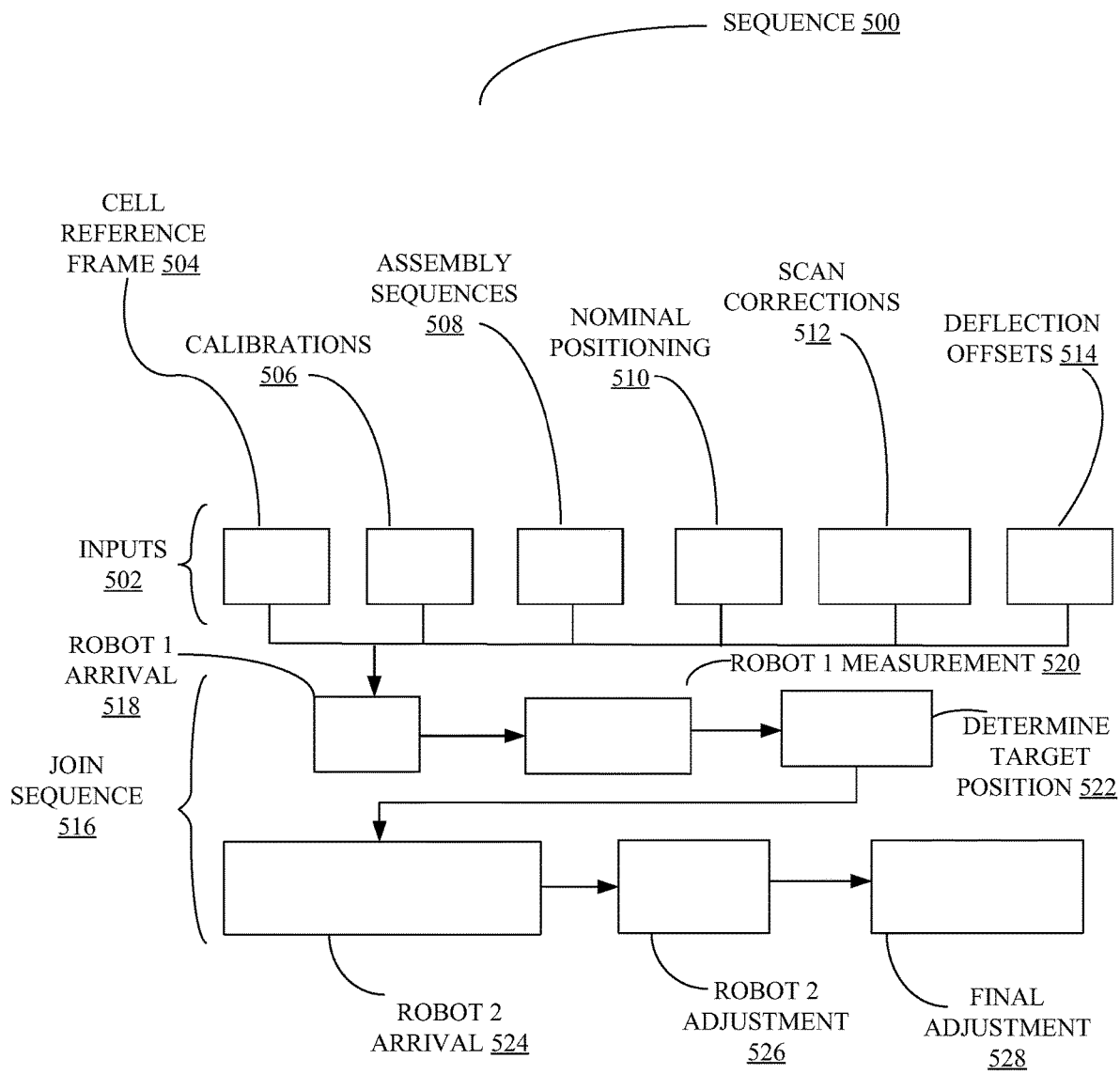
FIG. 5 illustrates an assembly input and flow diagram in accordance with an aspect of the present disclosure.

FIG. 5 illustrates an assembly input and flow diagram in accordance with an aspect of the present disclosure.

Sequence 500 illustrates a "relative position" join sequence. In sequence 500, the measured position of the first component is used to determine the target position of the second component. In this way, for example, compensation may be determined for only the second component, i.e., after the second component has been moved to the determined target position. This may provide better accuracy and may also reduce time to join components when compared to sequence 400 described herein. Both global position sequence 400 and relative position sequence 500 are envisioned as being within the scope of the present disclosure.

Sequence 500 includes inputs 502, which may include a cell reference frame 504, calibrations 506, assembly sequences 508, nominal positioning 510, scan corrections 512, and deflection offsets 514. Other inputs 502 may be employed within sequence 500 without departing from the scope of the present disclosure.

Once inputs 502 are received, one or more robots may execute join sequence 516. Join sequence 516 may include robot 1 arrival 518, robot 1 adjustment 520, determine target position 522, robot 2 arrival 524, and robot 2 adjustment 526, and final adjustment 528. Other functions and/or actions may be employed within join sequence 416 without departing from the scope of the present disclosure.

When using robots for assembly of components, e.g., as discussed with respect to FIG. 3, the robots, e.g., robots 307, 309, 311, 313, 315, and/or 317 may coordinate movements to properly position each component for assembly. Cell reference frame 504 may include the overall reference coordinates for the assembly procedure for the robots. Such coordinates may include a zero reference point for one or more robots, distances between robot coupling points and edges of parts, etc., such that a common reference framework may be provided to the assembly.

In an aspect of the present disclosure, e.g., when using CAD modeling, a reference frame for a coordinate system may be defined. The coordinate system may include absolute coordinates, relative coordinates, or a combination thereof. For a set of absolute coordinates, the cell reference frame 504 may be a global coordinate frame or global reference frame, and the cell reference frame 504 may include (e.g., may be bounded by and/or may be defined by) assembly cell 305.

The cell reference frame 504 may be established based on one or more ground references in assembly cell 305—such as one or more laser prisms, each of which may be measured in the assembly cell 305 such that, in the aggregate, a reference frame is defined with a number of reference points corresponding to the number of laser prisms. In an aspect of the present disclosure, a CAD model corresponding to assembly cell 305 may be an as-built CAD model, which may represent the assembly cell 305 more accurately than a nominal CAD model. Absolute coordinates based on CAD modeling may provide a degree of accuracy that is acceptable for assembly within sequence 500. For example, directing robots 307, 309, 311, 313, 315, 317 based on a cell reference frame 504 that includes absolute coordinates established through CAD modeling may adhere to various industry and/or safety standards that are to be observed during sequence 500.

In an aspect of the present disclosure, cell reference frame 504 may include relative coordinates that may be used for assembly system 300 as an alternative or supplement to an absolute coordinate system. In particular, relative coordinates may be used for some portions of sequence 500 in which a second structure may be joined to the first structure and/or joined to another structure. For example, a controller associated with an assembly robot may direct the robotic arm of the robot to a joining position based on a set of absolute and/or relative coordinates defined with respect to the cell reference frame 504.

The cell reference frame 504 may be the origin coordinate frame common to all objects in both a virtual assembly cell and the "physical" assembly cell 305. The cell reference frame 504 may be derived from the geometries of and relationships between specific objects in the assembly cell 305. In the virtual assembly cell, a reference frame may be defined using nominal digital definitions of the object geometries and their locations (i.e., CAD inputs). In the physical assembly cell, the cell reference frame 504 may be computed based on measurements of the same objects used to define the virtual assembly cell. The objects that are used to define the reference frame are chosen based on their capacity to enable accurate measurements in the physical assembly cell 305. In addition to measuring the objects that are used to compute the cell reference frame 504, additional measurement targets may be added to the physical cell and measured relative to said frame. This may be done to enable the locating of measurement instruments relative to the cell reference frame 504 when the instrument is unable to measure the original reference objects directly.

Calibrations 506 may include the distance each portion of the robot moves per input, the relative position of the robotic arm with respect to the cell reference frame 504, etc. Calibrations 506 may be measured (e.g., by the controller of the robot, by the controller of another robot, by another controller and/or processing system, etc.) after a given robot reaches the joining position based on the set of absolute coordinates, and the measured positions may be stored and/or updated over time. One or more controllers may position the robotic arm of a given robot based on the measured position, measured relative position, etc., of that robot's arm in the cell reference frame 404 and/or with respect to the position of another robot's robotic arm. Thus, a single correction to one robot may be performed instead of correcting multiple robot positions through calibrations 506.

Assembly sequences 508 may include the commands given by the controllers that move the robots during join sequence 516.

Nominal positioning 510 may describe or include the nominal, general, and or approximate positioning of robot arms when preparing for final assembly and/or joining of components.

Scan corrections 512 may describe or include corrections to the nominal positioning 510 inputs, which may be determined through measurement of robot arms relative positioning, measurement of a robot arm position relative to a component edge, or other corrective measurements made during join sequence 516.

Deflection offsets 514 may include or describe corrective movements that account for deflection of components when being manipulated by one or more robots. For example, a component may be contacted by a robot arm in such a way that the weight of the component deflects and/or sags the component in a certain direction. Deflection offsets may take such deflections into account when positioning robot arms during join sequence 516. Deflection offsets 514 may also take into account gravity, moment arms, etc. and the effects of gravity on the various components being assembled.

Once inputs 502 are received (e.g., by robots 307, 309, 311, 313, 315, and/or 317 and/or controllers 350, 352, 354, 356, 358, and/or 360, join sequence 516 responds to the various inputs 502 by manipulating the robot arms and/or components in accordance with the applicable inputs 502 for a given portion of join sequence 516.

Robot 1 arrival 518 is a response by a robot, e.g., robot 307, to inputs 502 that controls a robotic arm of robot 1, e.g., robot 307, to move a first component (i.e., structure, part, etc.) engaged by the robotic arm to an arrival location within cell reference frame 504. Arrival location is a target position of the first component from which the first component will be joined with a second component. In an aspect of the present disclosure, robot 1 is positioning a first component that will be joined to the second component, where the second component is being positioned by the robotic arm of another robot, e.g., robot 2. In various embodiments, the robotic arms may be part of the same robot.

Robot 1 measurement 520 is a measurement of the first component at the target position. In various embodiments, measuring the component at the target location may be performed by controlling a measurement device, such as a laser interferometer, optical scanner, or other measurement device, to perform a measurement, which may be performed directly and/or indirectly, as described in more detail above in reference to FIG. 4. In contrast to the embodiment of FIG. 4, which uses the measurement of the first component to adjust the position of the first component to compensate for a difference from the target position, in the "relative position" embodiment of FIG. 5 the measurement may be used to determine a target position for the second component. In this way, for example, the first component need not be moved to compensate for a difference between the measured position and the target position. This may shorten the time needed for the joining process and/or provide for more accurate joining.

Determine target position 522 is the determination of the target position for the second component engaged by robot 2. The target position for the second component is determined based on the measured position of the first component. In this way, for example, the target position of the second component may be determined more accurately. In various embodiments, a join frame of the first component may be determined based on its measured position, and the first component's join frame may be transformed (e.g., by rotating the join frame 180 degrees about the x-axis, then translating in the z-axis by an offset distance) into a nominal join frame of the second component, and the nominal join frame may be used to determine the target position of the second component. Join frames are described in more detail below with reference to FIG. 8.

Robot 2 arrival 524 is a response by a robot, e.g., robot 309, to inputs 502 that moves robot 2, e.g., robot 309, to the target position of the second component from which the second component will be joined with the first component.

Robot 2 adjustment 526 is a response by robot 2 to adjust the position of robot 2's robotic arm to compensate for a difference between an actual, e.g., measured, position and the target position, which may place the first component in a more precise location for when the two components will be joined together. Robot 2 adjustment 526 may include a similar process as robot 1 adjustment 420 described above with reference to FIG. 4. In the present example, robot 2 adjustment 526 may apply to "male" components, e.g., second AM part 204 having tongues or features such as features 212 and 214. A more detailed description of Robot 2 adjustment 526 is described with respect to FIGS. 6-9.

Final adjustment 528 (also known as a "join") 528 may include moving the first component and/or the second component to join the two components, i.e., moving only the first component towards the second component, moving only the second component towards the first component, or moving both components towards each other. Join 528 may include moving the components into the positions at which they will be fixed together, but not include the final fixing step.

Additional details related to the various steps described above are described with respect to FIGS. 6-9 below.

In various embodiments, the components may be joined and fixed together with adhesive. The adhesive may be applied to one or both of the components before they are moved to the target positions, for example. In another example, the adhesive may be applied after the components have be brought together to be joined, i.e., after join 528. In another example, adhesive may be applied after one or both of the components are moved to the target position(s). In various embodiments, the components may be welded, bolted, clamped, etc., together after join 528.

Movement Sequences

Figure 6:
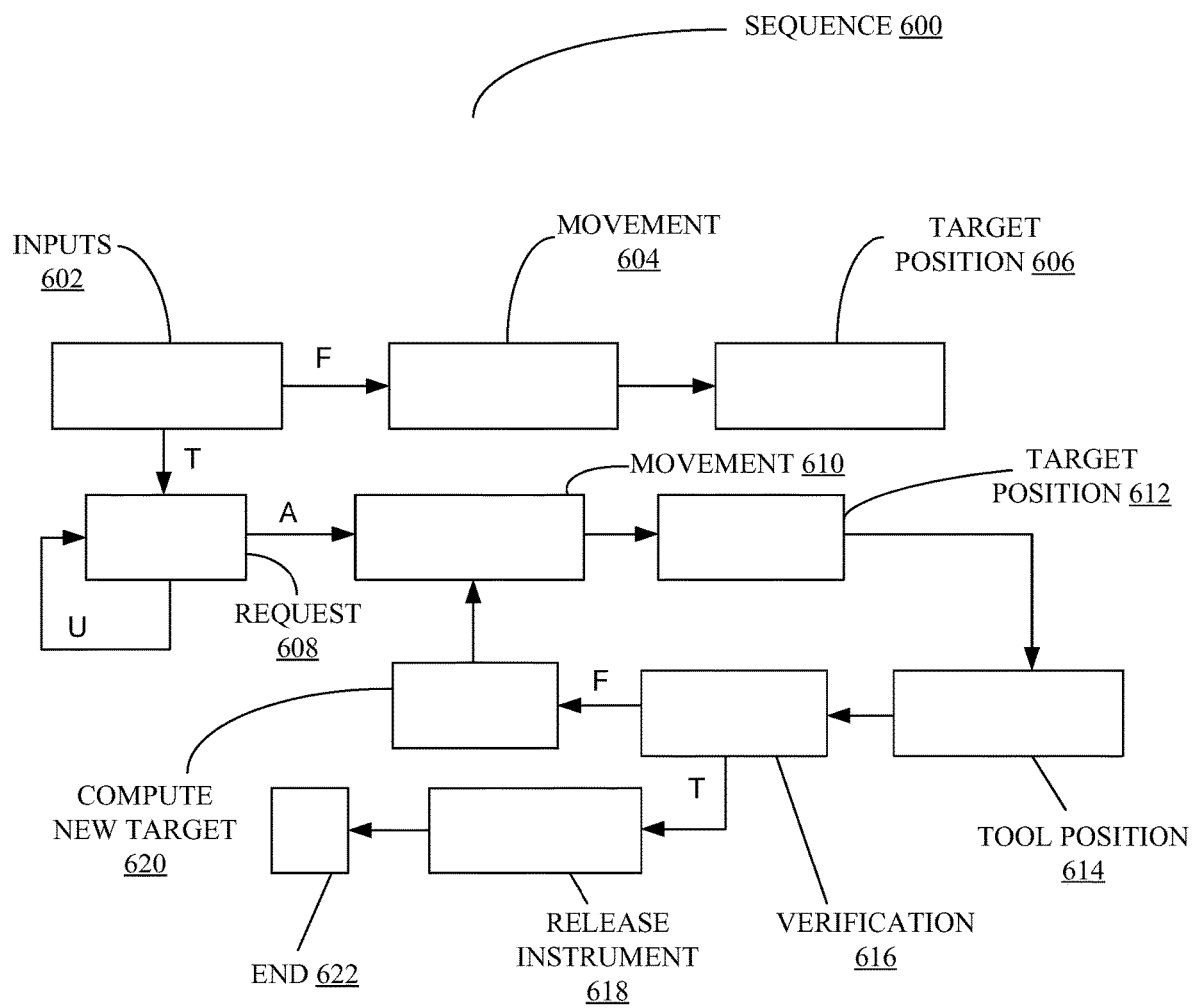
FIG. 6 illustrates a movement sequence in accordance with an aspect of the present disclosure.

FIG. 6 illustrates a movement sequence in accordance with an aspect of the present disclosure.

Sequence 600 may be used with assembly systems 300 that use tracking interferometers, such as laser interferometers, for measurement and tracking of robot movement within the cell reference frame. Inputs 602 define which portions of sequence 600 may be performed.

A tracking interferometer refers to any device that includes an interferometer that measures the change in position of a measurement target. An example of a tracking interferometer is a laser interferometer, which may be attached to two motorized axes of rotation, that measures the change in position of a mirror prism (measurement target). The measurement target in interferometer systems may be referred to as a "reflector." By measuring the change in position of the reflector and pointing the laser at the new calculated position, the tracking interferometer "tracks" the position of the reflector as the reflector moves relative to the device. A tracking interferometer in accordance with an aspect of the present disclosure is the Leica AT960-MR laser tracker. In an aspect of the present disclosure, a unique measurement target and/or reflector may be used to take one or more measurements. As it may be impractical to attach reflectors to each part in an assembly, in an aspect of the present disclosure, the target may be attached in a fixed position on the robot end-of-arm tool. As such, although the positions of the part join frames being assembled cannot be measured directly, the part positions can be determined as a fixed offset from the laser interferometer measurements.

Inputs 602 may include a join frame tool target position and a measurement of the target interferometer.

When the measurement is "false" (and/or already completed and/or or not needed), movement 604 is undertaken to move the robot in a given direction, e.g., the z direction. The robot then undertakes target position 606 movement by continuing movement to the target position.

When the measurement is "true" (and or desired by the robot as an update/initialization), request 608 is made to the measurement device (e.g., laser interferometer and/or other part of metrology system 331) to calibrate the robot's movements. If access is unavailable when the robot requests the measurements, the request is repeated until the measurements are available to the robot. Once the robot is given access to the measurement information, movement 610 is undertaken to move the robot in a given direction, e.g., the z direction. The robot then undertakes target position 612 movement by continuing movement to the target position.

At some point, e.g., when the robot arm, tool, etc., is in the target position, additional measurements may be taken of a tool position 614. This measurement may include pointing the tracker (laser) to the reflector on the robot arm, tool, etc., and sampling the data for a given amount of time (e.g., 1 second, 2 seconds, 500 milliseconds, etc.). The data can then be used to determine whether the robot arm, tool, etc. is within tolerances by verification 616. If the robot arm, tool, etc., is within the tolerances desired in verification 616, the robot releases access to the measurement instrument in release instrument 618. If the robot arm, tool, etc., is not within the tolerances desired in verification 616, the robot computes a new target location in computer new target 620, and returns to movement 610 to produce a new target position 612. The sequence 600 continues this feedback loop until verification 616 determines that the target position is within tolerances, and passes to release instrument 618 and finally end 622.

Figure 7:
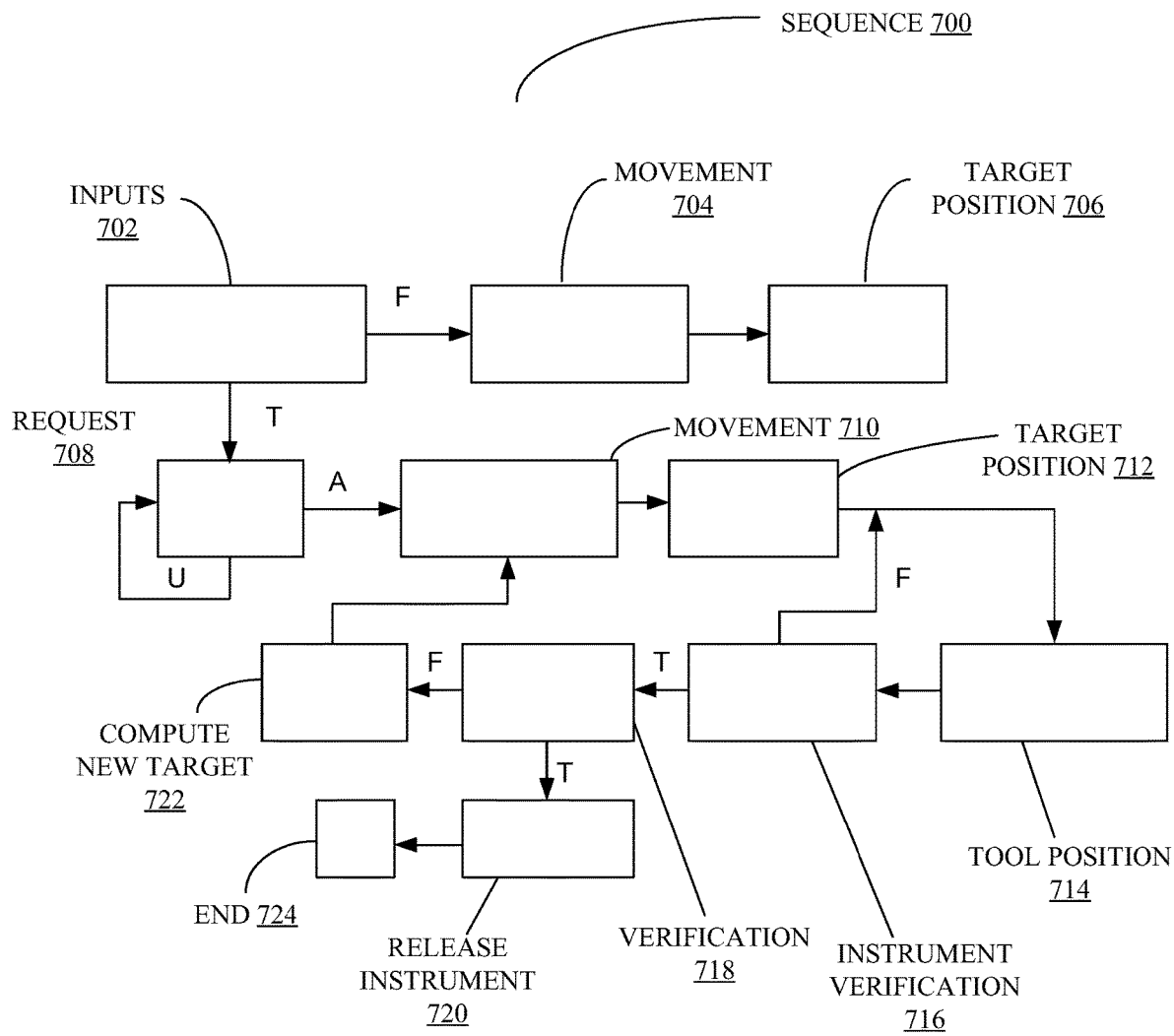
FIG. 7 illustrates a movement sequence in accordance with an aspect of the present disclosure.

FIG. 7 illustrates a movement sequence in accordance with an aspect of the present disclosure.

Sequence 700 may be used with assembly systems 300 that use optical scanners, such as 3D optical scanners, for measurement and tracking of robot movement within the cell reference frame. Inputs 702 define which portions of sequence 700 may be performed.

A 3D optical scanner refers to any instrument that uses light to measure points on an arbitrary surface. Technologies included in the 3D optical scanning family include structured light scanners, stereo vision, laser line scanners, flying dot scanners, and laser radar scanners. An example of a 3D optical scanner is the Nikon MV-300 Laser Radar.

Inputs 702 may include a join frame tool target position and a measurement of the target interferometer.

When the measurement is "false" (and/or already completed and/or or not needed), movement 704 is undertaken to move the robot in a given direction, e.g., the z direction. The robot then undertakes target position 706 movement by continuing movement to the target position.

When the measurement is "true" (and or desired by the robot as an update/initialization), request 708 is made to the measurement device (e.g., laser interferometer and/or other part of metrology system 331) to calibrate the robot's movements. If access is unavailable when the robot requests the measurements, the request is repeated until the measurements are available to the robot. Once the robot is given access to the measurement information, movement 710 is undertaken to move the robot in a given direction, e.g., the z direction. The robot then undertakes target position 712 movement by continuing movement to the target position.

At some point, e.g., when the robot arm, tool, etc., is in the target position, additional measurements may be taken of a tool position 714. This measurement may include scanning the measurement targets, removing background and edge data, performing a best fit geometry for each target, and/or computing a result for the position of the robot arm. The data from tool position is then checked to see if the measuring instrument was within tolerances, in instrument verification 716.

Instrument verification 716 determines if the target was vibrating, the instrument was vibrating, or other noise/interference within the measurement system introduced errors in the determination of tool position 714 data. If the instrument verification 716 was out of tolerances, tool position 714 is measured again until instrument verification 716 is determined to be within tolerances. Once instrument verification 716 is determined to be within tolerances, the tool position 714 data can be verified in verification 718, to determine whether the robot arm, tool, etc. is within tolerances.

If the robot arm, tool, etc., is within the tolerances desired in verification 718, the robot releases access to the measurement instrument in release instrument 720. If the robot arm, tool, etc., is not within the tolerances desired in verification 718, the robot computes a new target location in compute new target 722, and returns to movement 710 to produce a new target position 712. The sequence 700 continues this feedback loop until verification 716 determines that the target position is within tolerances, and passes to release instrument 720 and finally end 724.

Figure 8:
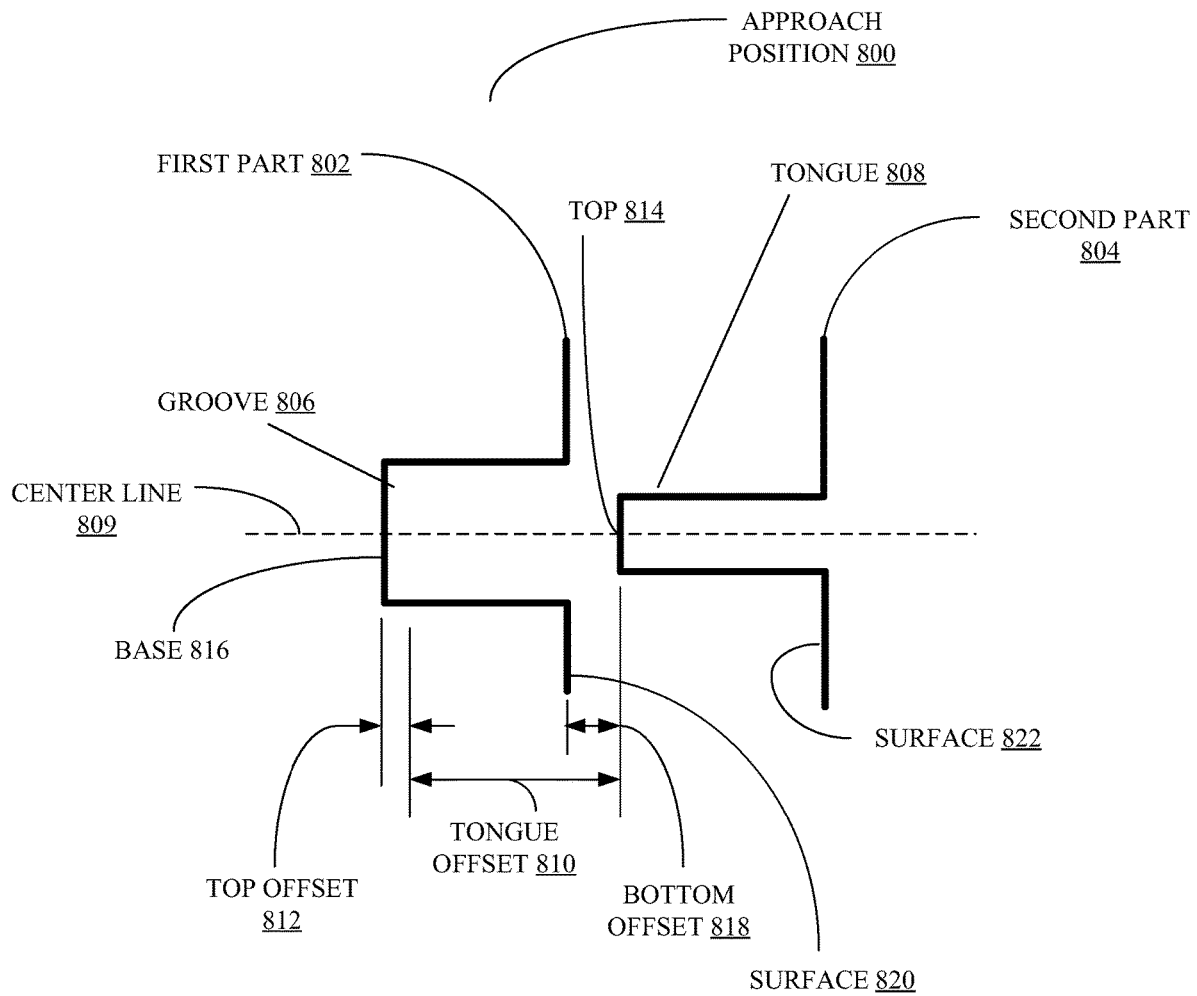
FIG. 8 illustrates an approach position in accordance with an aspect of the present disclosure.

FIG. 8 illustrates an approach position in accordance with an aspect of the present disclosure.

FIG. 8 illustrates approach position 800 for first part 802 and second part 804. First part includes one or more grooves 806, and second part 804 includes one or more tongues 808, which are designed to interact with each other when first part 802 and second part 804 are mated together. Center line 809 is shown as a "nominal" or desired position for approach position 800, although tongue 808 and/or groove 806 may be offset from center line 809. In an aspect of the present disclosure, the sequences 400, 500, 600, and/or 700 may be used to correct the positions of first part 802 and/or second part 804 with respect to each other and/or center line 809.

The tongue offset 810 is the distance that either first part 802, second part 804, or some combination of first part 802 and second part 804, must move to be in the join position. Top offset 812 is the distance between the top 814 of tongue 808 and the base 816 of groove 806 when first part 802 and second part 804 are in the join position, and bottom offset 818 is the distance between surface 820 of first part 802 and surface 822 of second part 804 when first part 802 and second part 804 are in the join position.

The nominal approach position may be defined using a nominal join frames, which are located within the part CAD models at the centroid of the joint area with the Z-axis oriented along the vector of insertion.

In an aspect of the present disclosure, a nominal join frame may be defined as follows.

Let TJF-A-N represent the 4×4 homogeneous transformation matrix of the nominal join frame of first part 802 with respect to a cell reference frame, e.g., cell reference frame 404, cell reference frame 504, etc., and let TJF-B-N represent the nominal join frame of second part 804 with respect to the same cell reference frame.

Approach position 800 obeys the following equation:

$$T_{JF-A-N} = T_{JF-B-N} * \begin{vmatrix} 1 & 0 & 0 & 0 \\ 0 & -1 & 0 & 0 \\ 0 & 0 & -1 & (-2 - \text{toungue offset 810}) \\ 0 & 0 & 0 & 1 \end{vmatrix}$$

$$T_{JF-A-N} = T_{JF-B-N} * \begin{vmatrix} 1 & 0 & 0 & 0 \\ 0 & -1 & 0 & 0 \\ 0 & 0 & -1 & (-2 - \text{toungue offset 810}) \\ 0 & 0 & 0 & 1 \end{vmatrix}$$

Figure 9:
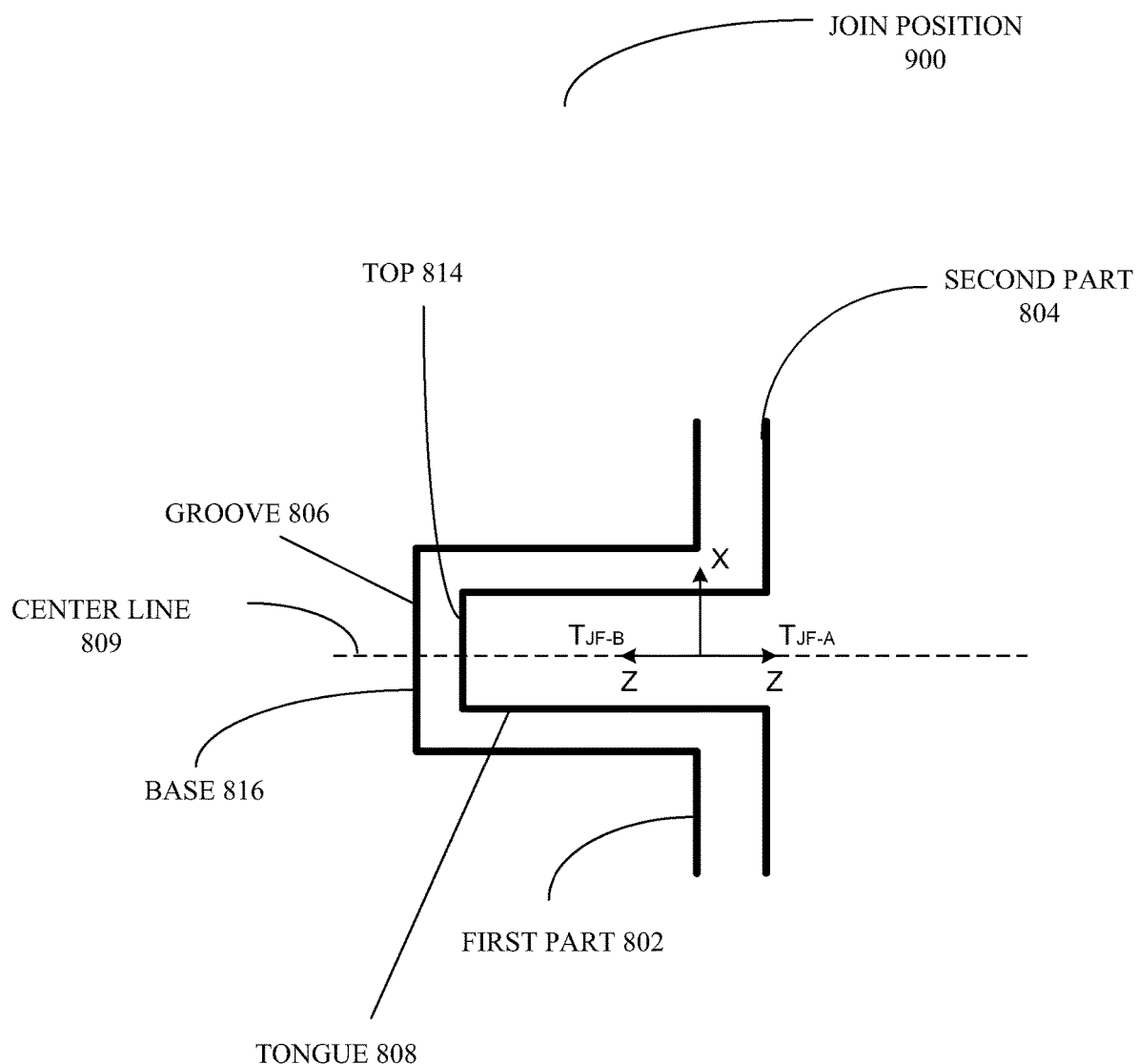
FIG. 9 illustrates a target position in accordance with an aspect of the present disclosure.

FIG. 9 illustrates a target position in accordance with an aspect of the present disclosure.

Join position 900 as shown in FIG. 9 illustrates first part 802 and second part 804 being moved together from approach position 800 shown in FIG. 8.

As with approach position 800, let $T_{JF-A-N}$ represent the 4×4 homogeneous transformation matrix of the nominal join frame of first part 802 with respect to a cell reference frame, e.g., cell reference frame 404, cell reference frame 504, etc., and let $T_{JF-B-N}$ represent the nominal join frame of second part 804 with respect to the same cell reference frame.

The nominal approach and join positions are defined using the nominal join frames, which are located within the part CAD models at the centroid of the joint area with the Z-axis oriented along the vector of insertion.

At the join position, the nominal join frames are defined as follows:

$$T_{JF-A-N} = T_{JF-B-N} * \begin{vmatrix} 1 & 0 & 0 & 0 \\ 0 & -1 & 0 & 0 \\ 0 & 0 & -1 & 0 \\ 0 & 0 & 0 & 1 \end{vmatrix}$$

Figure 10A:
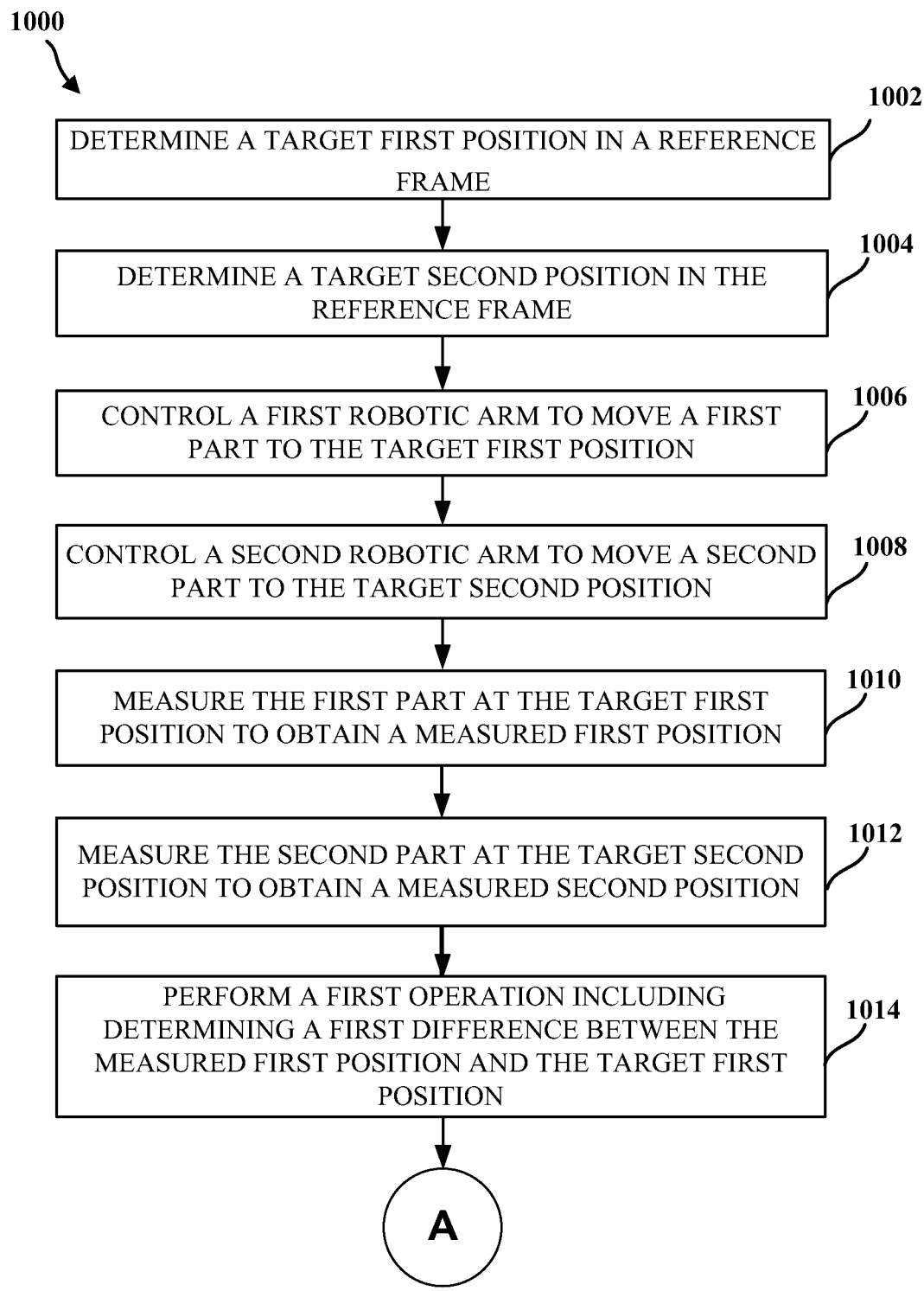
FIGS. 10A and 10B are a flow diagram of an example process for joining a structure with another structure in accordance with an aspect of the present disclosure.
Figure 10B:
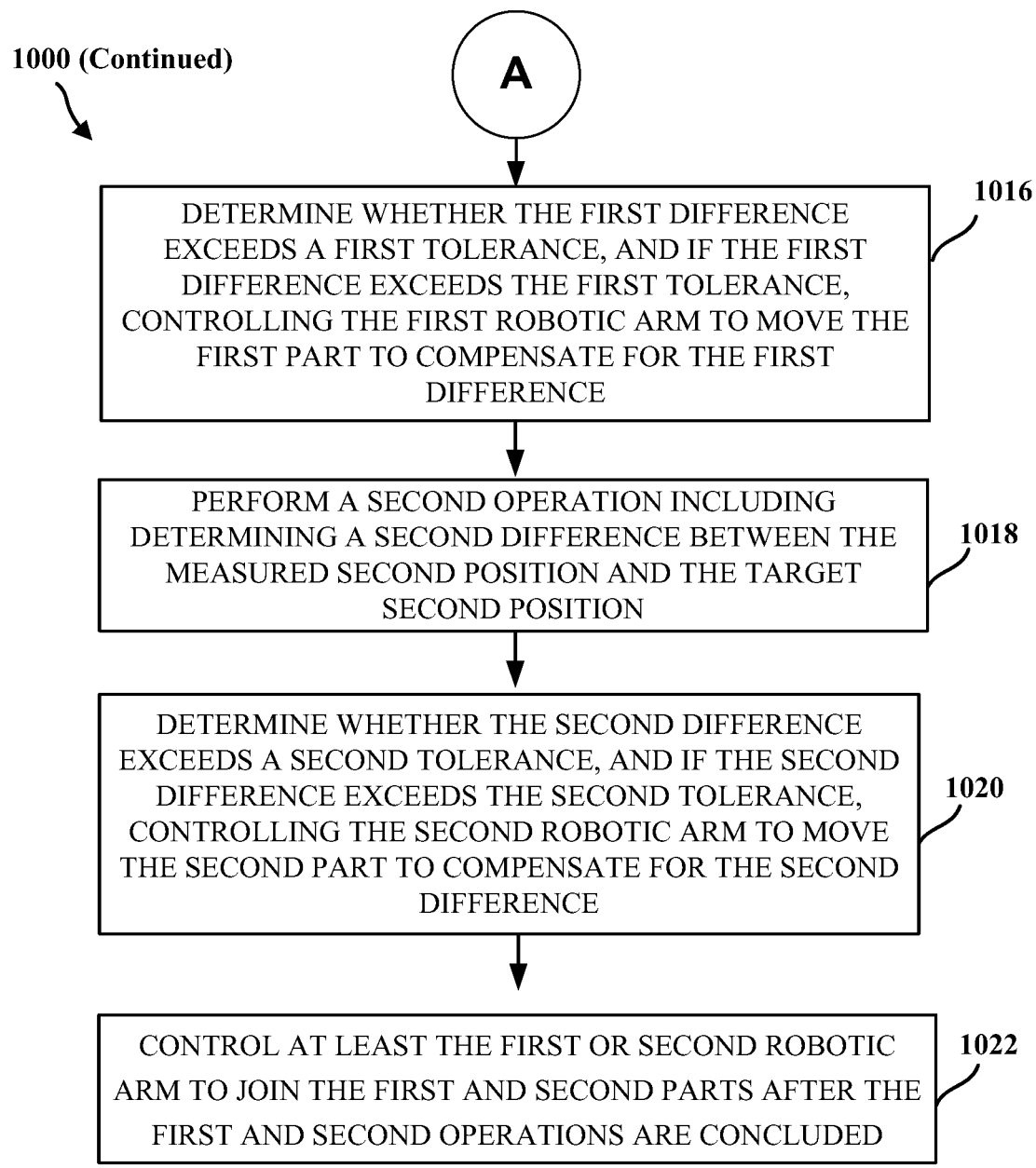

FIGS. 10A and 10B are a flow diagram 1000 of an example process for joining a structure with another structure in accordance with an aspect of the present disclosure.

In FIG. 10A, in 1002 a target first position is determined in a reference frame. 1002 may be performed by computing system 329, metrology system 331, or other devices.

In 1004, a target second position is determined in the reference frame. 1004 may be performed by computing system 329, metrology system 331, or other devices.

In 1006, a first robotic arm is controlled to move a first part to the target first position. 1006 may be performed by computing system 329, metrology system 331, controller 352, controller 354, controller 350, controller 356, controller 358, or other devices.

In 1008, a second robotic arm is controlled to move a second part to the target second position. 1008 may be performed by computing system 329, metrology system 331, controller 352, controller 354, controller 350, controller 356, controller 358, or other devices.

In 1010, the first part is measured at the target first position to obtain a measured first position. 1010 may be performed by computing system 329, metrology system 331, or other devices.

In 1012, the second part is measured at the target second position to obtain a measured second position. 1012 may be performed by computing system 329, metrology system 331, or other devices.

In 1014, a first operation is performed including determining a first difference between the measured first position and the target first position. Flow then passes to point A, which is shown again on FIG. 10B. 1014 may be performed by computing system 329, metrology system 331, controller 352, controller 354, controller 350, controller 356, controller 358, or other devices.

In FIG. 10B, in 1016, whether the first difference exceeds a first tolerance is determined, and if the first difference exceeds the first tolerance, the first robotic arm is controlled to move the first part to compensate for the first difference. 1016 may be performed by computing system 329, metrology system 331, controller 352, controller 354, controller 350, controller 356, controller 358, or other devices.

In 1018, a second operation is performed including determining a second difference between the measured second position and the target second position. 1018 may be performed by computing system 329, metrology system 331, controller 352, controller 354, controller 350, controller 356, controller 358, or other devices.

In 1020 whether the second difference exceeds a second tolerance is determined, and if the second difference exceeds the second tolerance, controlling the second robotic arm to move the second part to compensate for the second difference. 1020 may be performed by computing system 329, metrology system 331, controller 352, controller 354, controller 350, controller 356, controller 358, or other devices.

In 1022, at least the first or second robotic arm is controlled to join the first and second parts after the first and second operations are concluded. 1022 may be performed by computing system 329, metrology system 331, controller 352, controller 354, controller 350, controller 356, controller 358, or other devices.

Figure 11:
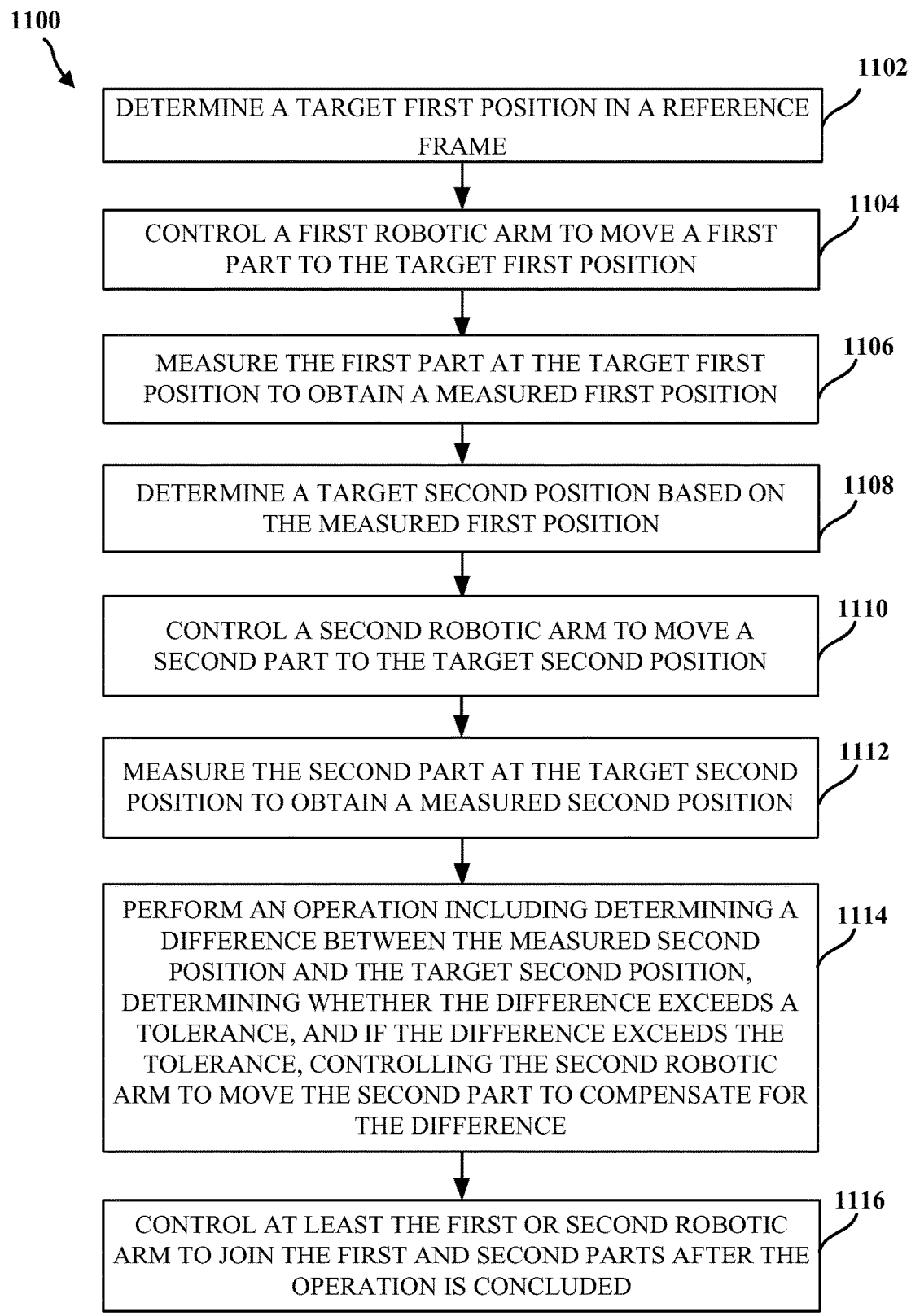
FIG. 11 is a flow diagram of an example process for joining a structure with another structure in accordance with an aspect of the present disclosure.

FIG. 11 is a flow diagram 1100 of an example process for joining a structure with another structure in accordance with an aspect of the present disclosure.

In 1102 a target first position is determined in a reference frame. 1102 may be performed by computing system 329, metrology system 331, or other devices.

In 1104, a first robotic arm is controlled to move a first part to the target first position. 1104 may be performed by computing system 329, metrology system 331, controller 352, controller 354, controller 350, controller 356, controller 358, or other devices.

In 1106, the first part is measured at the target first position to obtain a measured first position. 1106 may be performed by computing system 329, metrology system 331, or other devices.

In 1108, a target second position is determined based on the measured first position. 1108 may be performed by computing system 329, metrology system 331, controller 352, controller 354, controller 350, controller 356, controller 358, or other devices.

In 1110, a second robotic arm is controlled to move a second part to the target second position. 1110 may be performed by computing system 329, metrology system 331, controller 352, controller 354, controller 350, controller 356, controller 358, or other devices.

In 1112, the second part is measured at the target second position to obtain a measured second position. 1112 may be performed by computing system 329, metrology system 331, or other devices.

In 1114, an operation is performed including determining a difference between the measured second position and the target second position. 1114 may be performed by computing system 329, metrology system 331, controller 352, controller 354, controller 350, controller 356, controller 358, or other devices.

In 1116, whether the difference exceeds a tolerance is determined, and if the difference exceeds the tolerance, controlling the second robotic arm to move the second part to compensate for the difference. 1116 may be performed by computing system 329, metrology system 331, controller 352, controller 354, controller 350, controller 356, controller 358, or other devices.

In 1118, at least the first or second robotic arm is controlled to join the first and second parts after the operation is concluded. 1118 may be performed by computing system 329, metrology system 331, controller 352, controller 354, controller 350, controller 356, controller 358, or other devices.

The joining of one structure with another structure may occur after at least one structure is additively manufactured. Some aspects may be implemented using other tools, systems, or devices, as is discussed herein. For example, a 3-D printer system, such as the PBF system 100 discussed in FIGS. 1A-1E, may be used, and robots, such as those described with respect to FIG. 3, may also be used in one or more aspects of the present disclosure.

The previous description is provided to enable any person skilled in the art to practice the various aspects described herein. Various modifications to these example embodiments presented throughout this disclosure will be readily apparent to those skilled in the art, and the concepts disclosed herein may be applied to apparatus for automatic part joining in additively manufactured structures. Thus, the claims are not intended to be limited to the example embodiments presented throughout the disclosure but are to be accorded the full scope consistent with the language claims. All structural and functional equivalents to the elements of the example embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method for automatically joining parts, comprising:
   determining a target first position in a reference frame;
   controlling a first robotic arm to move a first part to the target first position;
   controlling a second robotic arm retaining a second part configured to be joined with the first part;
   measuring the first part at the target first position to obtain a measured first position;
   performing a first operation including determining a first difference between the measured first position and the target first position, determining whether the first difference exceeds a first tolerance, and if the first difference exceeds the first tolerance, controlling the first robotic arm to move the first part to compensate for the first difference;
   joining the first and second parts such that the first and second parts are joined without contact.

2. The method of claim 1, wherein measuring at least the first part at the target first position includes controlling at least a laser interferometer or an optical scanner to perform a measurement.

3. The method of claim 1, wherein controlling the first robotic arm includes controlling the first robotic arm in more than three degrees of freedom, and controlling the second robotic arm includes controlling the second robotic arm in more than three degrees of freedom.

4. The method of claim 3, wherein controlling the first robotic arm includes controlling the first robotic arm in six degrees of freedom, and controlling the second robotic arm includes controlling the second robotic arm in six degrees of freedom.

5. The method of claim 1, wherein the first target position is determined by at least a robot calibration, an assembly sequence, a nominal positioning, a best-fit analysis, or a gravity deflection offset.

6. The method of claim 1, wherein the first part comprises a tongue.

7. A non-transitory computer-readable medium storing computer executable code for automatically joining parts, the computer executable code when executed by a processor causes the processor to:
   determine a target first position in a reference frame;
   control a first robotic arm to move a first part to the target first position;
   control a second robotic arm retaining a second part configured to be joined with the first part;
   measure the first part at the target first position to obtain a measured first position;
   perform a first operation including determining a first difference between the measured first position and the target first position, determining whether the first difference exceeds a first tolerance, and if the first difference exceeds the first tolerance, controlling the first robotic arm to move the first part to compensate for the first difference;

joining the first and second parts such that the first and second parts are joined without contact.

8. The non-transitory computer-readable medium of claim 7,
wherein the computer executable code, for measuring at least the first part at the target first position, further includes computer executable code for controlling at least a laser interferometer or an optical scanner to perform a measurement.

9. The non-transitory computer-readable medium of claim 7,
wherein the computer executable code for controlling the first robotic arm further includes code for controlling the first robotic arm in more than three degrees of freedom, and the computer executable code for controlling the second robotic arm further includes computer executable code for controlling the second robotic arm in more than three degrees of freedom.

10. The non-transitory computer-readable medium of claim 9,
wherein the computer executable code for controlling the first robotic arm further includes code for controlling the first robotic arm in six degrees of freedom, and the computer executable code for controlling the second robotic arm further includes computer executable code for controlling the second robotic arm in six degrees of freedom.

11. The non-transitory computer-readable medium of claim 7,
wherein the target first position is determined by at least a robot calibration, an assembly sequence, a nominal positioning, a best-fit analysis, or a gravity deflection offset.

12. The non-transitory computer-readable medium of claim 7, wherein the first part comprises a tongue.

13. A system for automatically joining parts, comprising:
a first robot for manipulating a first part;
a second robot for manipulating a second part;
a measurement instrument; and
at least one controller, coupled to the first robot, the second robot, and the measurement instrument, wherein the at least one controller transmits signals to the first robot, the second robot, and the measurement instrument to:
move the first part to a target first position in a reference frame;
measure, with the measurement instrument, the first part at the target first position to obtain a measured first position;
perform a first operation including determining a first difference between the measured first position and the target first position, determining whether the first difference exceeds a first tolerance, and if the first difference exceeds the first tolerance, controlling the first robot to move the first part to compensate for the first difference;
join the first part and the second part such that the first and second parts are joined without contact.

14. The system of claim 13, wherein the measurement instrument is a laser interferometer.

15. The system of claim 13, wherein the measurement instrument is an optical scanner.

16. The system of claim 13, wherein the at least one controller controls the first robot in more than three degrees of freedom, and the at least one controller controls the second robot in more than three degrees of freedom.

17. The system of claim 16, wherein the at least one controller controls the first robot in six degrees of freedom, and the at least one controller controls the second robot in six degrees of freedom.

18. The system of claim 13, wherein the target first position is determined by at least a robot calibration, an assembly sequence, a nominal positioning, a best-fit analysis, or a gravity deflection offset.

19. A method for automatically joining parts, comprising:
determining a target first position in a reference frame;
controlling a first robotic arm to move a first part to the target first position;
measuring the first part at the target first position to obtain a measured first position;
determining a target second position based on the measured first position;
controlling a second robotic arm to move a second part to the target second position;
measuring the second part at the target second position to obtain a measured second position;
performing an operation including determining a difference between the measured second position and the target second position, determining whether the difference exceeds a tolerance, and if the difference exceeds the tolerance, controlling the first robotic arm or the second robotic arm to move the first part or the second part to compensate for the difference; and
joining the first and second parts such that the first and second parts are joined without contact.

20. The method of claim 19, wherein measuring at least the first part at the target first position or the second part at the target second position includes controlling at least a laser interferometer or an optical scanner to perform a measurement.

21. The method of claim 19, wherein controlling the first robotic arm includes controlling the first robotic arm in more than three degrees of freedom, and controlling the second robotic arm includes controlling the second robotic arm in more than three degrees of freedom.

22. The method of claim 21, wherein controlling the first robotic arm includes controlling the first robotic arm in six degrees of freedom, and controlling the second robotic arm includes controlling the second robotic arm in six degrees of freedom.

23. The method of claim 19, wherein at least the target first position or the target second position is determined by at least a robot calibration, an assembly sequence, a nominal positioning, a best-fit analysis, or a gravity deflection offset.

24. The method of claim 19, wherein the first part comprises a tongue.

25. A non-transitory computer-readable medium storing computer executable code for automatically joining parts, the code when executed by a processor causes the processor to:
determine a target first position in a reference frame;
control a first robotic arm to move a first part to the target first position;
measure the first part at the target first position to obtain a measured first position;
determine a target second position based on the measured first position;
control a second robotic arm to move a second part to the target second position;
measure the second part at the target second position to obtain a measured second position;

perform an operation including determining a difference between the measured second position and the target second position, determining whether the difference exceeds a tolerance, and if the difference exceeds the tolerance, controlling the first robotic arm or the second robotic arm to move the first part or the second part to compensate for the difference; and join the first part and the second part such that the first and second parts are joined without contact.

26. The non-transitory computer-readable medium of claim 25,
wherein the computer executable code, for measuring at least the first part at the target first position or the second part at the target second position, further includes computer executable code for controlling at least a laser interferometer or an optical scanner to perform a measurement.

27. The non-transitory computer-readable medium of claim 25,
wherein the computer executable code for controlling the first robotic arm further includes computer executable code for controlling the first robotic arm in more than three degrees of freedom, and the computer executable code for controlling the second robotic arm further includes computer executable code for controlling the second robotic arm in more than three degrees of freedom.

28. The non-transitory computer-readable medium of claim 27,
wherein the computer executable code for controlling the first robotic arm further includes computer executable code for controlling the first robotic arm in six degrees of freedom, and the computer executable code for controlling the second robotic arm further includes computer executable code for controlling the second robotic arm in six degrees of freedom.

29. The non-transitory computer-readable medium of claim 25,
wherein at least the target first position or the target second position is determined by at least a robot calibration, an assembly sequence, a nominal positioning, a best-fit analysis, or a gravity deflection offset.

30. A system for automatically joining parts, comprising:
a first robot for manipulating a first part;
a second robot for manipulating a second part;
a measurement instrument; and
at least one controller, coupled to the first robot, the second robot, and the measurement instrument, wherein the at least one controller transmits signals to the first robot, the second robot, and the measurement instrument to:
move the first part to a target first position in a reference frame;
measure, with the measurement instrument, the first part at the target first position to obtain a measured first position;
move the second part to a target second position in the reference frame, the target second position based on the measured first position;
measure, with the measurement instrument, the second part at the target second position to obtain a measured second position;
perform an operation including determining a difference between the measured second position and the target second position, determining whether the difference exceeds a tolerance, and if the difference exceeds the tolerance, controlling the first robotic arm or the second robot to move the first part or the second part to compensate for the difference; and
join the first part and the second part such that the first and second parts are joined without contact.

31. The system of claim 30, wherein the measurement instrument is a laser interferometer.

32. The system of claim 30, wherein the measurement instrument is an optical scanner.

33. The system of claim 30, wherein the at least one controller controls the first robot in more than three degrees of freedom, and the at least one controller controls the second robot in more than three degrees of freedom.

34. The system of claim 33, wherein the at least one controller controls the first robot in six degrees of freedom, and the at least one controller controls the second robot in six degrees of freedom.

35. The system of claim 30, wherein at least the target first position or the target second position is determined by at least a robot calibration, an assembly sequence, a nominal positioning, a best-fit analysis, or a gravity deflection offset.

36. The system of claim 30, wherein joining the first part and the second part includes a joining material.

37. The system of claim 36, wherein the joining material is between the first part and the second part.

38. The system of claim 36, wherein the joining material is on a surface of the first part or the second part.

39. The system of claim 36, wherein the joining material includes an adhesive.

40. The system of claim 30, wherein the first part or the second part includes a feature.

41. The system of claim 40, wherein the feature is configured to facilitate engagement of the first part or the second part by an end effector of the first robot or the second robot.

42. The system of claim 40, wherein the feature is configured to increase a strength of the first part or the second part.

43. The system of claim 42, wherein the feature includes a mesh, a honeycomb or a lattice.

44. The method of claim 1, wherein joining the first part and the second part includes positioning a joining material between the first part and the second part.

45. The method of claim 1, wherein joining the first part and the second part includes placing a joining material on a surface of the first part or the second part.

46. The method of claim 45, wherein the joining material includes an adhesive.

47. The method of claim 1, wherein the first part or the second part includes a feature.

48. The method of claim 47, wherein the feature is co-printed with the first part or the second part.

49. The method of claim 47, wherein the feature is configured to facilitate engagement of the first part or the second part by an end effector of the first robotic arm or the second robotic arm.

50. The method of claim 47, wherein the feature is configured to increase a strength of the first part or the second part.

51. The method of claim 50, wherein the feature includes a mesh, a honeycomb or a lattice.

52. The method of claim 6, wherein the second part comprises a groove.

53. The method of claim 52, wherein joining the first and second parts comprises:
placing a joining material within at least a portion of the groove; and
inserting at least a portion of the tongue into the groove.

54. The method of claim 53, wherein the joining material includes an adhesive, and the method further comprising curing the adhesive such that the adhesive bonds the tongue to the second part.

55. The non-transitory computer-readable medium of claim 7, wherein joining the first part and the second part includes positioning a joining material between the first part and the second part.

56. The non-transitory computer-readable medium of claim 7, wherein joining the first part and the second part includes placing a joining material on a surface of the first part or the second part.

57. The non-transitory computer-readable medium of claim 56, wherein the joining material includes an adhesive.

58. The non-transitory computer-readable medium method of claim 7, wherein the first part or the second part includes a feature.

59. The non-transitory computer-readable medium of claim 58, wherein the feature is configured to facilitate engagement of the first part or the second part by an end effector of the first robotic arm or the second robotic arm.

60. The non-transitory computer-readable medium of claim 58, wherein the feature is configured to increase a strength of the first part or the second part.

61. The non-transitory computer-readable medium of claim 60, wherein the feature includes a mesh, a honeycomb or a lattice.

62. The non-transitory computer-readable medium of claim 12, wherein the second part comprises a groove.

63. The non-transitory computer-readable medium of claim 62, wherein joining the first and second parts comprises:
  placing a joining material within at least a portion of the groove; and
  inserting at least a portion of the tongue into the groove.

64. The non-transitory computer-readable medium of claim 63, wherein the joining material includes an adhesive, and the computer executable code further includes code for curing the adhesive such that the adhesive bonds the tongue to the second part.

65. The system of claim 13, wherein joining the first part and the second part includes a joining material.

66. The system of claim 65, wherein the joining material is between the first part and the second part.

67. The system of claim 65, wherein the joining material is on a surface of the first part or the second part.

68. The system of claim 65, wherein the joining material includes an adhesive.

69. The system of claim 13, wherein the first part or the second part includes a feature.

70. The system of claim 69, wherein the feature is configured to facilitate engagement of the first part or the second part by an end effector of the first robot or the second robot.

71. The system of claim 69, wherein the feature is configured to increase a strength of the first part or the second part.

72. The system of claim 71, wherein the feature includes a mesh, a honeycomb or a lattice.

73. The method of claim 19, wherein joining the first part and the second part includes positioning a joining material between the first part and the second part.

74. The method of claim 19, wherein joining the first part and the second part includes placing a joining material on a surface of the first part or the second part.

75. The method of claim 74, wherein the joining material includes an adhesive.

76. The method of claim 19, wherein the first part or the second part includes a feature.

77. The method of claim 76, wherein the feature is co-printed with the first part or the second part.

78. The method of claim 76, wherein the feature is configured to facilitate engagement of the first part or the second part by an end effector of the first robotic arm or the second robotic arm.

79. The method of claim 76, wherein the feature is configured to increase a strength of the first part or the second part.

80. The method of claim 79, wherein the feature includes a mesh, a honeycomb or a lattice.

81. The method of claim 24, wherein the second part comprises a groove.

82. The method of claim 81, wherein joining the first and second parts comprises:
  placing a joining material within at least a portion of the groove; and
  inserting at least a portion of the tongue into the groove.

83. The method of claim 82, wherein the joining material includes an adhesive, and the method further comprising curing the adhesive such that the adhesive bonds the tongue to the second part.

84. The non-transitory computer-readable medium of claim 25, wherein joining the first part and the second part includes positioning a joining material between the first part and the second part.

85. The non-transitory computer-readable medium of claim 25, wherein joining the first part and the second part includes placing a joining material on a surface of the first part or the second part.

86. The non-transitory computer-readable medium of claim 85, wherein the joining material includes an adhesive.

87. The non-transitory computer-readable medium method of claim 25, wherein the first part or the second part includes a feature.

88. The non-transitory computer-readable medium of claim 87, wherein the feature is configured to facilitate engagement of the first part or the second part by an end effector of the first robotic arm or the second robotic arm.

89. The non-transitory computer-readable medium of claim 87, wherein the feature is configured to increase a strength of the first part or the second part.

90. The non-transitory computer-readable medium of claim 89, wherein the feature includes a mesh, a honeycomb or a lattice.

91. The non-transitory computer-readable medium of claim 25, wherein the first part includes a tongue.

92. The non-transitory computer-readable medium of claim 91, wherein the second part includes a groove.

93. The non-transitory computer-readable medium of claim 92, wherein joining the first and second parts comprises:
  placing a joining material within at least a portion of the groove; and
  inserting at least a portion of the tongue into the groove.

94. The non-transitory computer-readable medium of claim 93, wherein the joining material includes an adhesive, and the computer executable code further includes code for curing the adhesive such that the adhesive bonds the tongue to the second part.

* * * * *